US012528293B2

(12) United States Patent
Mikoshiba et al.

(10) Patent No.: US 12,528,293 B2
(45) Date of Patent: Jan. 20, 2026

(54) LIQUID EJECTING HEAD AND LIQUID EJECTING APPARATUS

(71) Applicant: SEIKO EPSON CORPORATION, Tokyo (JP)

(72) Inventors: Masanori Mikoshiba, Shimosuwa-machi (JP); Motoki Takabe, Shiojiri (JP); Harunobu Koike, Matsumoto (JP); Kei Kiyose, Shinagawa-ku (JP); Yasuhiro Itayama, Kai (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/441,448

(22) Filed: Feb. 14, 2024

(65) Prior Publication Data

US 2024/0278564 A1 Aug. 22, 2024

(30) Foreign Application Priority Data

Feb. 16, 2023 (JP) ................................ 2023-022961

(51) Int. Cl.
*B41J 2/14* (2006.01)

(52) U.S. Cl.
CPC ...................... *B41J 2/14274* (2013.01); *B41J 2002/14483* (2013.01); *B41J 2202/11* (2013.01)

(58) Field of Classification Search
CPC .......... B41J 2/14274; B41J 2002/14483; B41J 2202/11; B41J 2002/14241; B41J 2002/14419; B41J 2002/14491; B41J 2/14233; B41J 2/14201
See application file for complete search history.

(56) References Cited

U.S. PATENT DOCUMENTS

2008/0012907 A1* 1/2008 Takahashi ............ B41J 2/14233 347/68

FOREIGN PATENT DOCUMENTS

JP 2014-197576 A 10/2014

* cited by examiner

*Primary Examiner* — Lisa Solomon
(74) *Attorney, Agent, or Firm* — WORKMAN NYDEGGER

(57) ABSTRACT

A liquid ejecting head includes a substrate having pressure chambers in communication with nozzles through which a liquid is ejected, a vibration plate on the substrate, and a piezoelectric actuator including a first electrode, a piezoelectric layer, and a second electrode stacked in a first direction on the vibration plate. The piezoelectric layer of the piezoelectric actuator has an active portion that overlaps the pressure chamber, the first electrode, and the second electrode when viewed in the first direction and a non-active portion that does not overlap at least one of the first electrode and the second electrode when viewed in the first direction. A piezoelectric material forming the piezoelectric layer has a larger crystal grain size in the non-active portion than in the active portion.

15 Claims, 16 Drawing Sheets

LIQUID EJECTING HEAD AND LIQUID EJECTING APPARATUS

The present application is based on, and claims priority from JP Application Serial Number 2023-022961, filed Feb. 16, 2023, the disclosure of which is hereby incorporated by reference herein in its entirety.

BACKGROUND

1. Technical Field

The present disclosure relates to a liquid ejecting head that includes a vibration plate and a piezoelectric actuator including a first electrode, a piezoelectric layer, and a second electrode, and to a liquid ejecting apparatus including the liquid ejecting head.

2. Related Art

A typical example of a liquid ejecting head, which is a piezoelectric device, is an ink jet recording head that discharges ink droplets. A known ink jet recording head includes, for example, a channel forming substrate having pressure chambers in communication with nozzles and a piezoelectric actuator including, in sequence, a lower electrode, a piezoelectric layer, and an upper electrode, on the channel forming substrate with a vibration plate therebetween. The piezoelectric actuator changes the pressure of ink in the pressure chambers, and thus ink droplets are ejected through the nozzles.

In such a liquid ejecting head, active portions having the piezoelectric actuators are present in the form of segments corresponding to the pressure chambers. A piezoelectric layer extends continuously over the multiple segments with a non-active portion located therebetween (see JP-A-2014-197576).

However, such piezoelectric actuators have the risk that the piezoelectric body will have strain accumulation due to repeated voltage application and thus will be excessively deformed even when no voltage is applied, resulting in significant deterioration of the discharge characteristics.

JP-A-2014-197576 proposes a structure including an extended portion 93 in the boundary area between the active portion and the non-active portion. The metal layer on the upper electrode serves as a weight and limits the movement of the piezoelectric actuator to reduce excessive deformation. This reduces the stress generated in the boundary area between the active portion and the non-active portion, and thus reduces the possibility that the piezoelectric layer 70 will be damaged by the stress concentration in the boundary area.

The “extended portion 93” in JP-A-2014-197576 can reduce the deformation, and thus can reduce the stress applied to the boundary area between the active portion and the non-active portion. However, the fact remains that the stress is applied to the boundary area. The conventionally known problem of easy cracking in the piezoelectric layer has not been fully solved.

SUMMARY

To solve the problem, there is a need for a liquid ejecting head in which stress in the boundary area between the active portion and the non-active portion is minimized to eliminate the risk of significant deterioration of the discharge characteristics, which may be caused by voltage application repeated for a long period of time.

Such a problem occurs not only in an ink jet recording head that discharges ink, but also in liquid ejecting heads that eject liquids other than ink.

According to an aspect of the present disclosure, a liquid ejecting head includes: a substrate having pressure chambers in communication with nozzles through which a liquid is ejected; a vibration plate on the substrate; and a piezoelectric actuator including a first electrode, a piezoelectric layer, and a second electrode stacked in a first direction on the vibration plate, wherein the piezoelectric layer has an active portion that overlaps the pressure chamber, the first electrode, and the second electrode when viewed in the first direction and a non-active portion that does not overlap at least one of the first electrode and the second electrode when viewed in the first direction, the active portion and the non-active portion are continuously provided in the piezoelectric layer, and a piezoelectric material forming the piezoelectric layer has a larger crystal grain size in the non-active portion than in the active portion.

According to another aspect of the present disclosure, a liquid ejecting apparatus includes the above-described liquid ejecting head.

DESCRIPTION OF EMBODIMENTS

Figure 1:
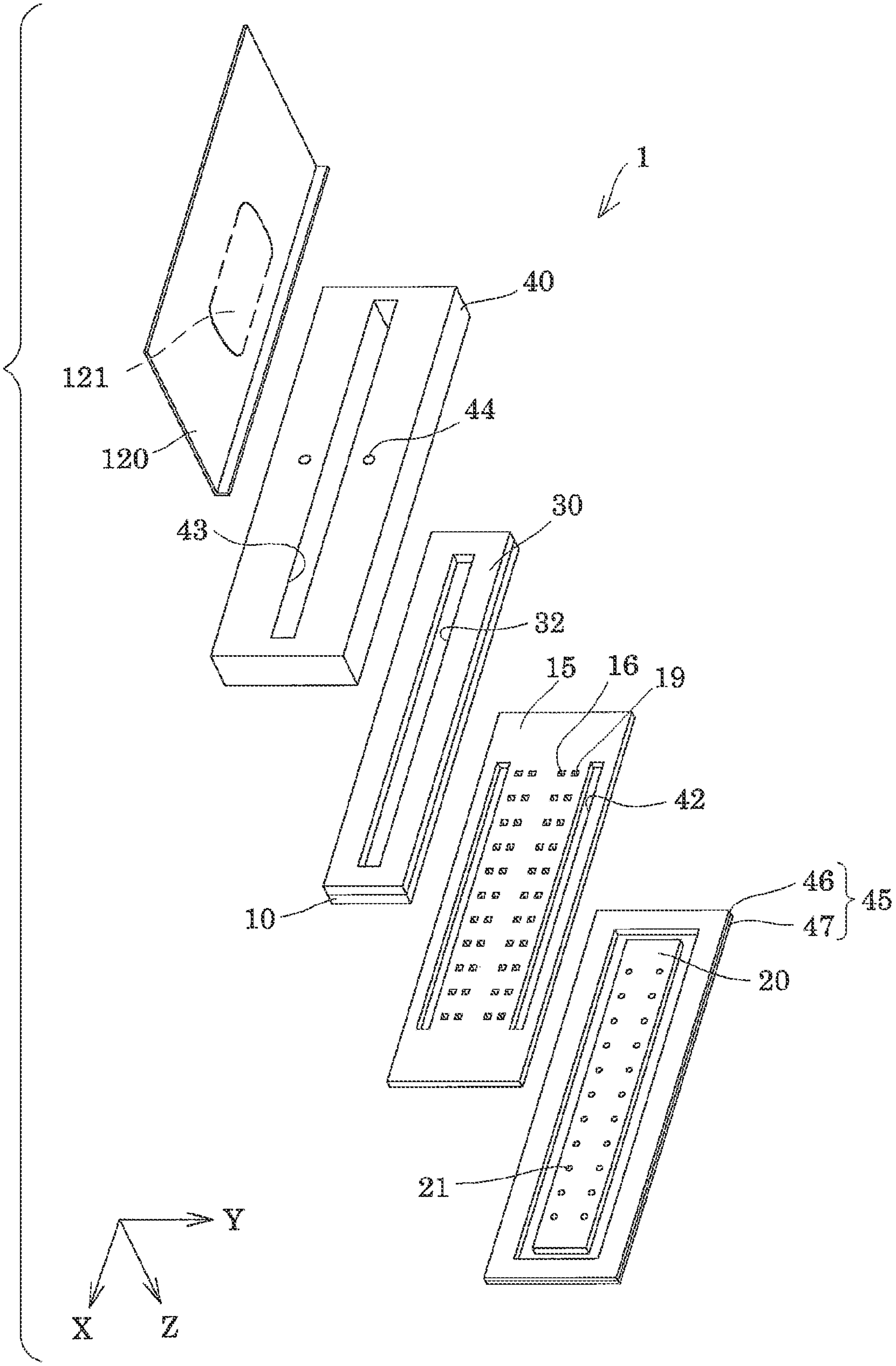
FIG. 1 is an exploded perspective view illustrating a recording head according to a first embodiment.

Hereinafter, the present disclosure will be described in detail with reference to embodiments. The following is a description of an aspect of the present disclosure. Any modification can be made within the scope of the present disclosure. The same reference numerals are assigned to the same components in the drawings without duplicated explanation. In the drawings, X, Y, and Z represent three orthogonal spatial axes. Herein, the directions along these axes are referred to as X, Y, and Z directions. The directions pointed by the arrows in the drawings are referred to as positive (+) directions and the opposite directions are referred to as negative (−) directions. The directions of three spatial axes of X, Y, and Z without limitation of the positive and negative directions are referred to as the X direction, Y direction, and Z direction. The Z direction corresponds to the vertical direction. The +Z direction corresponds to a vertically downward direction, and the −Z direction corresponds to a vertically upward direction.

First Embodiment

Figure 2:
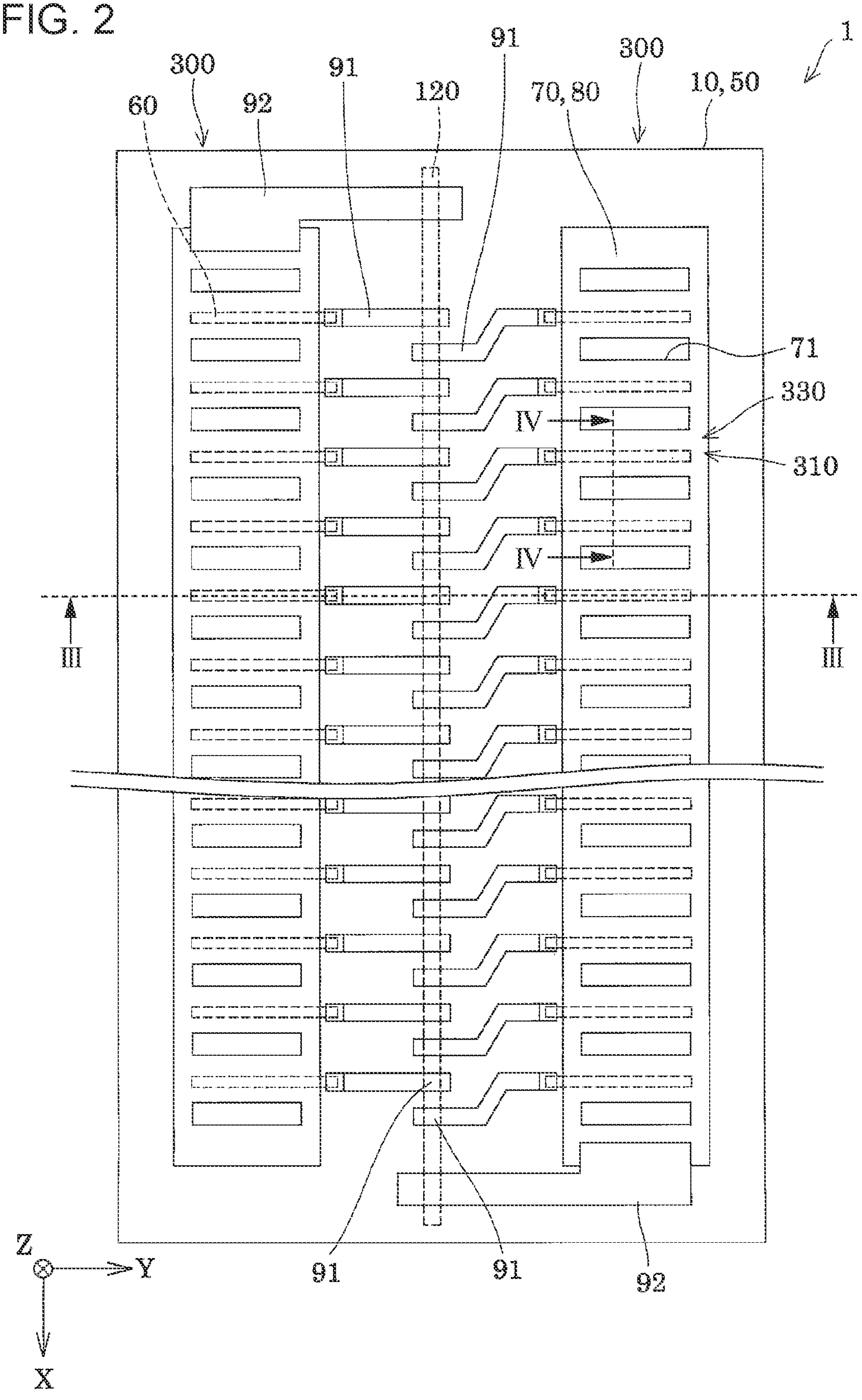
FIG. 2 is a plan view illustrating the recording head according to the first embodiment.
Figure 3:
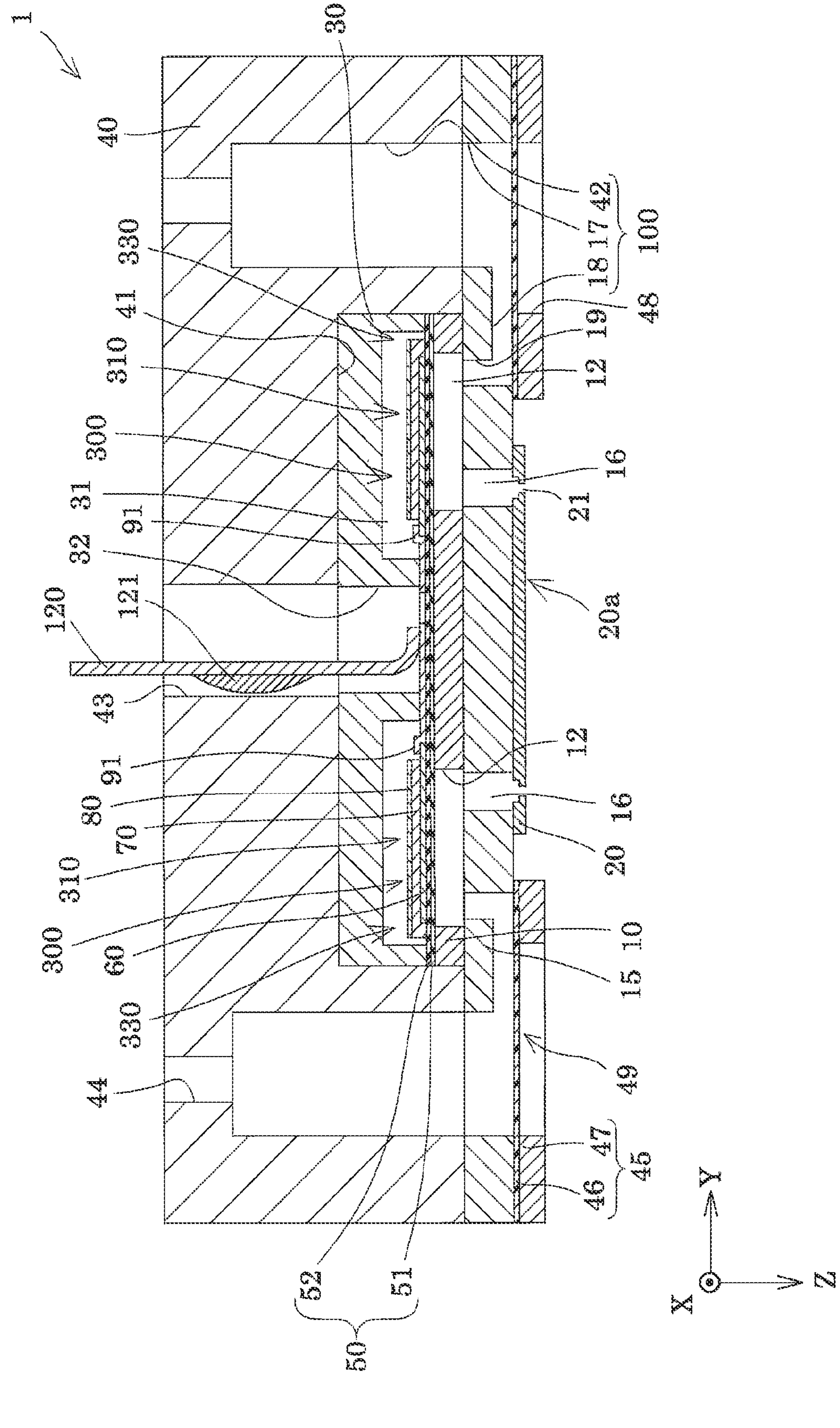
FIG. 3 is a cross-sectional view illustrating the recording head according to the first embodiment.
Figure 4:
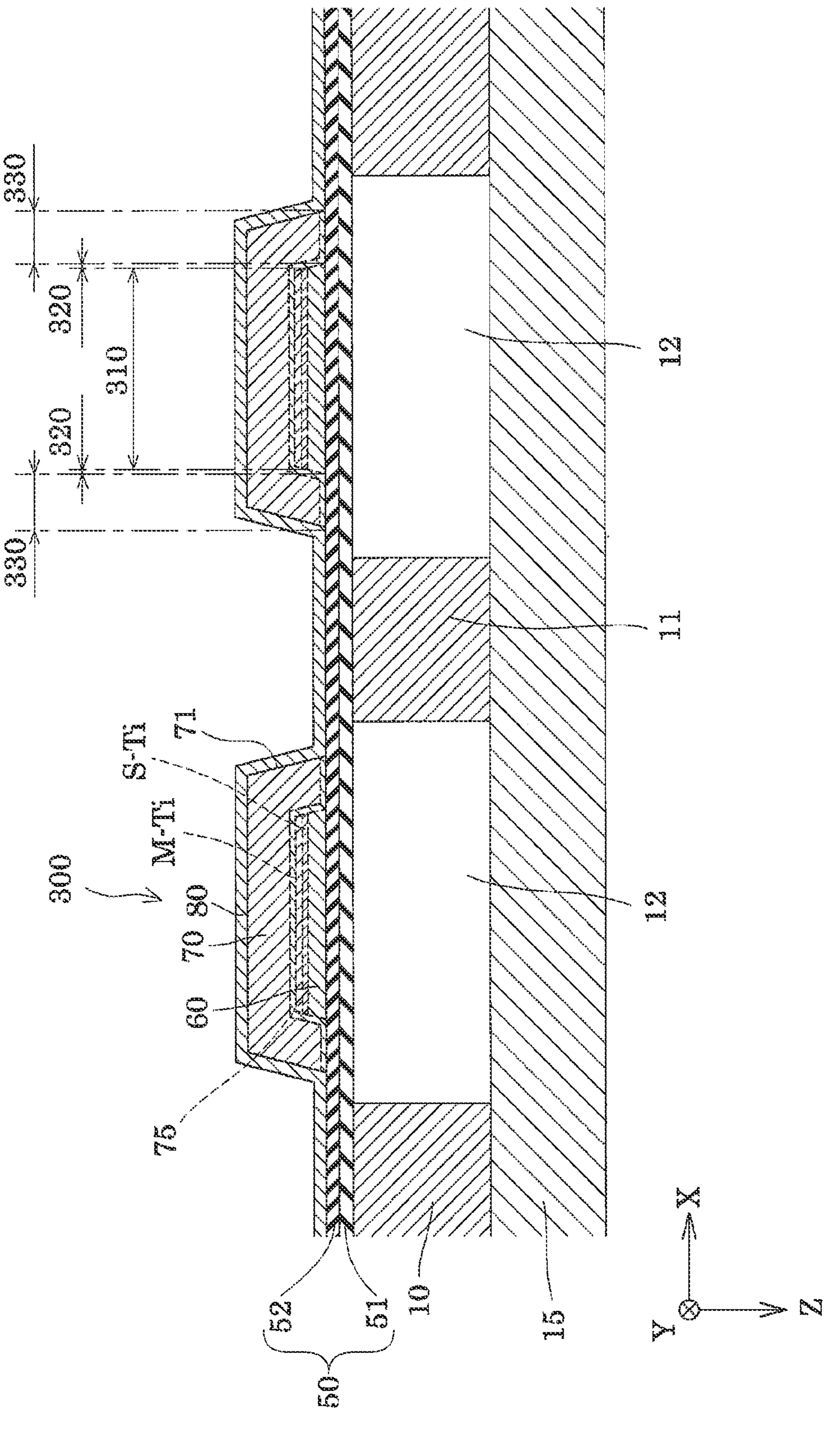
FIG. 4 is a cross-sectional view illustrating main components of the recording head according to the first embodiment.

FIG. 1 is an exploded perspective view of an ink jet recording head 1, which is an example of a liquid ejecting head according to a first embodiment of the present disclosure. FIG. 2 is a plan view of the recording head 1. FIG. 3 is a cross-sectional view taken along line III-III in FIG. 2. FIG. 4 is a cross-sectional view taken along line IV-IV in FIG. 2.

As illustrated in the drawings, an ink jet recording head 1 (hereinafter, may be simply referred to as a recording head 1), which is an example of the liquid ejecting head according to the present embodiment, includes a channel forming substrate 10, which is an example of the "substrate". The channel forming substrate 10 may be a silicon substrate, a glass substrate, an SOI substrate, or any ceramic substrate. The channel forming substrate 10 may be a (100) or (110) preferentially oriented substrate, as described in detail below.

The channel forming substrate 10 has the pressure chambers 12 arranged in the X direction. In other words, the X direction corresponds to the "arrangement direction" in this embodiment. The pressure chambers 12 are arranged in a straight line in the X direction at the same positions in the Y direction. The pressure chambers 12 adjacent to each other in the X direction are separated by a partition wall 11. In this embodiment, the pressure chambers 12 are arranged in two lines extending in the X direction, and the lines are arranged side by side in the Y direction. The arrangement of the pressure chambers 12 should not be limited to this. For example, the pressure chambers 12 arranged in the X direction may be alternately shifted in the Y direction, so-called staggered arrangement.

In this embodiment, the shape of the pressure chamber 12 viewed in the Z direction may be a rectangle, a parallelogram, or an oval having a rectangular base and semicircular ends in the longitudinal direction, such as a rounded rectangle, ellipse, or egg-like shape, a circle shape, or a polygon.

A communication plate 15 and a nozzle plate 20 are stacked in sequence on a surface of the channel forming substrate 10 facing in the +Z direction. Here, the Z direction corresponds to the "first direction."

The communication plate 15 has nozzle communication passages 16 through which the pressure chambers 12 and nozzles 21 are in communication with each other.

The communication plate 15 further has first and second manifold portions 17 and 18 that constitute a manifold 100, which serves as a common liquid chamber in communication with the pressure chambers 12. The first manifold portion 17 extends through the communication plate 15 in the Z direction. The second manifold portion 18 has an opening in the surface facing in the +Z direction but does not extend through the communication plate 15 in the Z direction.

The communication plate 15 further has supply communication passages 19 provided independently for the respective pressure chambers 12 and in communication with one end in the Y direction of the pressure chamber 12. The supply communication passage 19 allows communication between the second manifold portion 18 and the pressure chamber 12, enabling ink in the manifold 100 to flow into the pressure chamber 12.

The communication plate 15 may be formed of, for example, a silicon substrate, a glass substrate, an SOI substrate, any ceramic substrate, or a metal substrate such as a stainless-steel substrate. The communication plate 15 may be formed of a material having substantially the same thermal expansion coefficient as the material of the channel forming substrate 10. The channel forming substrate 10 and the communication plate 15 that are formed of the materials having substantially the same thermal expansion coefficient are less likely to be thermally warped due to difference in thermal expansion coefficients.

The nozzle plate 20 is disposed on a surface of the communication plate 15 away from the channel forming substrate 10 or a surface facing in the +Z direction.

The nozzle plate 20 has the nozzles 21 in communication with the pressure chambers 12 through the nozzle communication passages 16. In this embodiment, the nozzles 21 are arranged in two lines extending in the X direction, and the nozzle lines are away from each other in the Y direction. In other words, the nozzles 21 in each line are located at the same position in the Y direction. The arrangement of the nozzles 21 should not be limited to this. For example, the nozzles 21 arranged in the X direction may be alternately shifted in the Y direction, so-called staggered arrangement. The nozzle plate 20 may be formed of a silicon substrate, a glass substrate, an SOI substrate, any ceramic substrate, a metal substrate such as a stainless-steel substrate, or an organic material such as polyimide resin. The nozzle plate 20 may be formed of a material having substantially the same thermal expansion coefficient as the material of the communication plate 15. The nozzle plate 20 and the communication plate 15 that are formed of the materials having substantially the same thermal expansion coefficient are less likely to be thermally warped due to difference in thermal expansion coefficients.

A casing 40 is fixed to a surface of the communication plate 15 facing in the −Z direction. The casing 40 has a third manifold portion 42 in communication with the first manifold portion 17. The first and second manifold portions 17 and 18 in the communication plate 15 and the third manifold portion 42 in the casing 40 constitute the manifold 100 of this embodiment. The manifold 100 extends continuously in the X direction over the pressure chambers 12 for each line of the pressure chambers 12 arranged in the X direction. The supply communication passages 19, which allow communication between the pressure chambers 12 and the manifolds 100, are arranged in the X direction. The casing 40 has inlets 44 that are in communication with the manifolds 100 and through which ink is supplied to the manifolds 100. The casing 40 further has a coupling opening 43 that is in communication with a through hole 32 in a protection plate 30, which is described in detail below, and receives a wiring board 120.

A compliance plate 45 is disposed on the surface of the communication plate 15 that faces in the +Z direction and that has openings of the first and second manifold portions 17 and 18. The compliance plate 45 seals the openings of the first and second manifold portions 17 and 18 that face in the +Z direction. In this embodiment, the compliance plate 45 includes a sealing film 46 formed of a flexible thin film and a fixing plate 47 formed of a hard material such as a metal. The fixing plate 47 has openings 48, which are through holes extending in the thickness direction, in an area corresponding to the manifolds 100. Thus, the manifolds 100 each have a flexible compliance portion 49, defined only by the flexible sealing film 46. The compliance portion 49 is subjected to flexural deformation to absorb pressure fluctuations of the ink in the manifold 100.

On a surface of the channel forming substrate 10 facing in the −Z direction, the vibration plate 50 and the piezoelectric actuator 300, which includes a first electrode 60, a piezoelectric layer 70, and a second electrode 80 stacked in the Z direction from the vibration plate 50, are stacked in sequence.

The vibration plate 50 includes an elastic layer 51 adjacent to the channel forming substrate 10 and an insulating layer 52 adjacent to the piezoelectric actuator 300.

The elastic layer 51 is formed of a material containing silicon oxide ($SiO_x$), such as silicon dioxide ($SiO_2$). The elastic layer 51 containing silicon oxide may contain any other material as long as it contains silicon oxide as a main component. When the main component of the elastic layer 51 is silicon oxide, the elastic layer 51 contains at least 50% by mass silicon oxide. The elastic layer 51 containing silicon oxide is typically amorphous. The channels such as the pressure chambers 12 are formed by anisotropic etching on the surface of the channel forming substrate 10 facing in the +Z direction, and the surface of the pressure chamber 12 facing in the −Z direction is defined by the elastic layer 51. The vibration plate 50 includes the elastic layer 51 containing silicon oxide on the channel forming substrate 10 side. Thus, the elastic layer 51 can function as an etching stop layer when anisotropic etching using an alkaline solution such as KOH is performed on a surface of the channel forming substrate 10 away from the vibration plate 50. Thus, the pressure chambers 12 can be formed densely and precisely by anisotropic etching on the channel forming substrate 10, and the vibration plate 50 is less likely to have variations in the thickness. The method of forming the pressure chambers 12 should not be limited to anisotropic etching, and may be dry etching, or other techniques. The material of the elastic layer 51 should not be limited to one containing silicon oxide. For example, the elastic layer 51 may be a portion of the channel forming substrate 10. The elastic layer 51 may be formed of a silicon substrate, a glass substrate, an SOI substrate, or any ceramic substrate. Examples of the material of the elastic layer 51 include zirconium oxide ($ZrO_x$) such as zirconium dioxide ($ZrO_2$), silicon nitride ($Si_3N_4$), titanium oxide ($TiO_2$), aluminum oxide ($Al_2O_3$), hafnium oxide ($HfO_2$), magnesium oxide ($MgO$), and lanthanum aluminate ($LaAlO_3$). The elastic layer 51 may be an organic film such as a polyimide film or a parylene film. The elastic layer 51 should not be limited to amorphous and may have a preferentially oriented crystalline structure such as single crystal silicon.

The insulating layer 52 may contain zirconium oxide ($ZrO_x$), such as zirconium dioxide ($ZrO_2$). The insulating layer 52 containing zirconium oxide may contain any other material as long as it contains zirconium oxide as a main component. When the main component of the insulating layer 52 is zirconium oxide, the insulating layer 52 contains at least 50% by mass zirconium oxide. The insulating layer 52 containing zirconium oxide can reduce the possibility that components of the piezoelectric layer 70, such as lead (Pb) and bismuth (Bi), which will be described in detail below, will be diffused into the layers below the insulating layer 52, such as the elastic layer 51 and the channel forming substrate 10. Thus, the presence of the insulating layer 52 containing zirconium oxide can reduce defects such as reduction in stiffness, which will be caused by diffusion of components of the piezoelectric layer 70 into the elastic layer 51 and the channel forming substrate 10.

Furthermore, the insulating layer 52 formed of an insulating material can reduce short circuiting of the first electrodes 60 provided for the active portions 310, which will be described in detail below. Even if the first electrode 60 is a common electrode for the active portions 310, the insulating layer 52 should be formed of an insulating material. If the insulating layer 52 is a conductive layer, the insulating layer 52 will apply an electric field to the piezoelectric layer 70 in areas other than the first electrode 60. In this embodiment, the vibration plate 50 includes the elastic layer 51 and the insulating layer 52. However, the present disclosure should not be limited to this. The vibration plate 50 may include only one of the elastic layer 51 and the insulating layer 52, or may include another layer in addition to the elastic layer 51 and the insulating layer 52.

The piezoelectric actuator 300, which warps the vibration plate 50 to change the pressure of ink in the pressure chamber 12, is disposed on the surface of the insulating layer 52 facing in the −Z direction. The piezoelectric actuator 300 includes the first electrode 60, the piezoelectric layer 70, and the second electrode 80, which are stacked in sequence in the −Z direction from the vibration plate 50. The piezoelectric actuator 300 is a pressure generator that applies pressure to the ink in the pressure chamber 12. The piezoelectric actuator 300, also called a piezoelectric element, includes the first electrode 60, the piezoelectric layer 70, and the second electrode 80. The piezoelectric layer 70 of the piezoelectric actuator 300 has a portion called an active portion 310 that overlaps the pressure chamber 12 when viewed in the Z direction and is subjected to piezoelectric strain when a voltage is applied between the first electrode 60 and the second electrode 80. In other words, the active portion 310 is a portion of the piezoelectric layer 70 of the piezoelectric actuator 300 where the pressure chamber 12, the first electrode 60, and the second electrode 80 overlap each other when viewed in the Z direction. In contrast, the piezoelectric layer 70 of the piezoelectric actuator 300 has a portion called a non-active portion 330 that is not subjected to piezoelectric strain. In other words, the non-active portion 330 is a portion of the piezoelectric layer 70 of the piezoelectric actuator 300 that does not overlap at least one of the first electrode 60 and the second electrode 80. In this embodiment, the active portion 310 is provided for each of the pressure chambers 12. Thus, the piezoelectric actuator 300 has multiple active portions 310. Typically, one of the electrodes of the active portion 310 is an individual electrode provided independently for each of the active portions 310, and the other is a common electrode shared by the active portions 310. In this embodiment, the first electrode 60 is the individual electrode, and the second electrode 80 is the common electrode. Certainly, the first electrode 60 may be a common electrode, and the second electrode 80 may be an individual electrode. A portion of the piezoelectric actuator 300 that faces the pressure chamber 12 in the Z direction is flexible, and a portion that is located outwardly from the pressure chamber 12 is not flexible.

Specifically, as illustrated in FIGS. 2 and 3, the first electrodes 60 are individual electrodes, which are cut pieces provided for the respective pressure chambers 12 and provided independently for the respective active portions 310. The first electrode 60 has a smaller width in the X direction than the pressure chamber 12. In other words, the ends in the X direction of the first electrode 60 are in the area opposed to the pressure chamber 12. As illustrated in FIG. 3, the end of the first electrode 60 adjacent to the nozzle 21 is located outwardly from the pressure chamber 12 in the Y direction. An individual lead electrode 91, which is a lead-out line, is coupled to the end of the first electrode 60 located outwardly from the pressure chamber 12 in the Y direction.

Examples of the first electrode 60 include iridium (Ir), platinum (Pt), palladium (Pd), gold (Au), nickel (Ni), chromium (Cr), nickel-chromium (NiCr), tungsten (W), titanium (Ti), titanium dioxide ($TiO_x$), and titanium tungsten (TiW).

As illustrated in FIGS. 2 to 4, the piezoelectric layer 70 having a predetermined width in the Y direction extends continuously in the X direction. The width of the piezoelectric layer 70 in the Y direction is longer than the length of the pressure chamber 12 in the Y direction, which is the longitudinal direction. Thus, the piezoelectric layer 70 extends over the pressure chamber 12 beyond the +Y and −Y direction side ends of the pressure chamber 12. The end of the piezoelectric layer 70 away from the nozzle 21 is located outwardly from the first electrode 60 in the Y direction. In other words, the end of the first electrode 60 away from the nozzle 21 is covered by the piezoelectric layer 70. The end of the piezoelectric layer 70 adjacent to the nozzle 21 is located inwardly from the first electrode 60, and the end of the first electrode 60 adjacent to the nozzle 21 is not covered by the piezoelectric layer 70. The individual lead electrode 91 formed of gold (Au) or the like is coupled to the end of the first electrode 60 extending beyond the piezoelectric layer 70, as described above.

The piezoelectric layer 70 has recesses 71 at positions corresponding to the partition walls 11. The width of the recess 71 in the X direction is equal to or larger than the width of the partition wall 11. In this embodiment, the width of the recess 71 in the X direction is larger than the width of the partition wall 11. In this configuration, the portions of the vibration plate 50 facing the +X and −X direction side ends of the pressure chamber 12, or the arms of the vibration plate 50, have lower stiffness, enabling the piezoelectric actuator 300 to be readily displaced. The recess 71 may extend through the piezoelectric layer 70 in the Z direction, which is the thickness direction, or may extend halfway through the piezoelectric layer 70 in the thickness direction without extending through the piezoelectric layer 70 in the Z direction. In other words, the bottom of the recess 71 may have no piezoelectric layer 70 or may have a portion of the piezoelectric layer 70 at the end in the +Z direction.

The piezoelectric layer 70 is formed of a piezoelectric material including a composite oxide having a perovskite structure indicated by the general formula $ABO_3$. In this embodiment, the piezoelectric material is lead zirconate titanate (PZT, $Pb(Zr,Ti)O_3$). PZT as the piezoelectric material can form the piezoelectric layer 70 having a relatively large piezoelectric constant $d_{31}$.

In a composite oxide having a perovskite-structure indicated by the general formula $ABO_3$, the A site is coordinated by 12 oxygen ligands, and the B site is coordinated by 6 oxygen ligands to form an octahedron. In this embodiment, lead (Pb) is located at the A site, and zirconium (Zr) and titanium (Ti) are located at the B site.

The piezoelectric material should not be limited to the PZT. Other elements may be present at the A and B sites. Other examples of the piezoelectric material include perovskite materials such as barium zirconate titanate ($Ba(Zr,Ti)O_3$), lead lanthanum zirconate titanate ($(Pb,La)(Zr,Ti)O_3$), lead magnesium niobate zirconium titanate ($Pb(Zr,Ti)(Mg,Nb)O_3$), and silicon lead niobate zirconate titanate ($Pb(Zr,Ti,Nb)O_3$).

The piezoelectric material may be a material having low Pb content, so-called low-lead material, or a material having no Pb, so-called a non-lead material. The use of a low-lead material as the piezoelectric material can reduce the Pb usage. The use of a non-lead material as the piezoelectric material can eliminate the use of Pb. The use of low-lead or non-lead material as the piezoelectric material can reduce the environmental impact.

The non-lead piezoelectric material may be, for example, a BFO-based material containing bismuth iron oxide (BFO, $BiFeO_3$). In BFO, Bi is located at the A site and iron (Fe) is located at the B site. BFO may further contain other elements. For example, BFO may additionally include at least one element selected from the group consisting of manganese (Mn), aluminum (Al), lanthanum (La), barium (Ba), titanium (Ti), cobalt (Co), cerium (Ce), samarium (Sm), chromium (Cr), potassium (K), lithium (Li), calcium (Ca), strontium (Sr), vanadium (V), niobium (Nb), tantalum (Ta), molybdenum (Mo), tungsten (W), nickel (Ni), zinc (Zn), praseodymium (Pr), neodymium (Nd), and europium (Eu).

Another example of the non-lead piezoelectric material is a KNN-based material containing potassium sodium niobate (KNN, $KNaNbO_3$). KNN may further contain other elements. For example, KNN may additionally include at least one selected from the group consisting of manganese (Mn), lithium (Li), barium (Ba), calcium (Ca), strontium (Sr), zirconium (Zr), titanium (Ti), bismuth (Bi), tantalum (Ta), antimony (Sb), iron (Fe), cobalt (Co), silver (Ag), magnesium (Mg), zinc (Zn), copper (Cu), vanadium (V), chromium (Cr), molybdenum (Mo), tungsten (W), nickel (Ni), aluminum (Al), silicon (Si), lanthanum (La), cerium (Ce), praseodymium (Pr), neodymium (Nd), promethium (Pm), samarium (Sm), and europium (Eu).

Examples of the piezoelectric material also include a material that has a composition in which some elements are lost, a material that has a composition in which some elements are excessive, and a material that has a composition in which some elements are replaced with other elements. As long as the basic properties of the piezoelectric layer 70 remain the same, the materials having a non-stoichiometric composition due to the loss or excess and the materials in which some elements are replaced with other elements may be used as the piezoelectric materials of this embodiment. The piezoelectric materials that can be used in this embodiment should not be limited to the above-described materials containing Pb, Bi, Na, and K, for example.

The piezoelectric layer 70 has a (100) preferential p orientation. The piezoelectric layer 70 has a thickness that does not allow cracking in the production process but allows sufficient displacement (0.5 to 5 μm).

As illustrated in FIGS. 2 to 4, the second electrode 80 extends continuously on the surface of the piezoelectric layer 70 that is away from the first electrode 60 and faces in the −Z direction, and is the common electrode shared by the multiple active portions 310. The second electrode 80 has a predetermined length in the Y direction and extends continuously in the X direction. The second electrode 80 is also provided on the inner surface of the recess 71, i.e., on the side surfaces of the recess 71 of the piezoelectric layer 70 and on the insulating layer 52 as the bottom of the recess 71. The second electrode 80 may be provided only on a portion of the inner surface of the recess 71 and does not need to be provided on the entire inner surface of the recess 71.

The individual lead electrodes 91, which are lead-out lines, extend from the first electrodes 60. A common lead electrode 92, which is a lead-out line, extends from the second electrode 80. The ends of the individual lead electrode 91 and the common lead electrode 92 opposite from the ends coupled to the piezoelectric actuator 300 are coupled to the flexible wiring board 120. A drive circuit 121 having switching elements for driving the piezoelectric actuators 300 is mounted on the wiring board 120.

As illustrated in FIGS. 1 and 3, the protection plate 30 having substantially the same size as the channel forming substrate 10 having the piezoelectric actuators 300 is attached to the surface of the channel forming substrate 10 facing in the −Z direction. The protection plate 30 has holders 31 that are spaces for protecting the piezoelectric actuators 300. The holder 31 is provided independently for each of the lines of the piezoelectric actuators 300 arranged in the X direction, and two holders 31 are arranged in the Y direction. Furthermore, the protection plate 30 has a through hole 32 extending therethrough in the Z direction between two lines of the holders 31 arranged in the Y direction. The individual lead electrodes 91 and the common lead electrodes 92 extend from the electrodes of the piezoelectric actuator 300 to have ends in the through hole 32. The individual lead electrodes 91 and the common lead electrodes 92 are electrically coupled to the wiring board 120 in this through hole 32.

The casing 40 has substantially the same shape as the above-described communication plate 15 when viewed in the Z direction and is attached to the protection plate 30 and the above-described communication plate 15.

The casing 40 has a recess 41 opening in the +Z direction and having a depth enough to house the channel forming substrate 10 and the protection plate 30. The opening of the recess 41 facing in the +Z direction is sealed by the communication plate 15 with the channel forming substrate 10 and the other components being in the recess 41. The casing 40 has the third manifold portion 42 on each of the +Y and −Y direction side of the recess 41. The third manifold portion 42 has an opening facing in the +Z direction. The first and second manifold portions 17 and 18 in the channel forming substrate 10 and the third manifold portion 42 in the casing 40 constitute the manifold 100. The manifold 100 is provided for each line of the pressure chambers 12, a total of two manifolds 100. The manifold 100 extends continuously in the X direction for the pressure chambers 12. The pressure chambers 12 and the manifold 100 are in communication with each other through the supply communication passages 19 arranged in the X direction.

The compliance plate 45 is disposed on the surface of the communication plate 15 that faces in the +Z direction and has openings of the first and second manifold portions 17 and 18. The compliance plate 45 seals the openings of the first manifold portion 17 and the second manifold portion 18 that are adjacent to a liquid ejecting surface 20*a*. In this embodiment, the compliance plate 45 includes a sealing film 46 formed of a flexible thin film and a fixing plate 47 formed of a hard material such as a metal. The fixing plate 47 has openings 48, which are through holes extending in the thickness direction, in an area corresponding to the manifolds 100. Thus, the manifolds 100 are each adjacent to the compliance portion 49, defined only by the flexible sealing film 46.

A method of producing the recording head 1 according to the present embodiment will be described here. FIGS. 5 to 15 are cross-sectional views illustrating a method of producing the recording head 1 according to the present embodiment.

Figure 5:
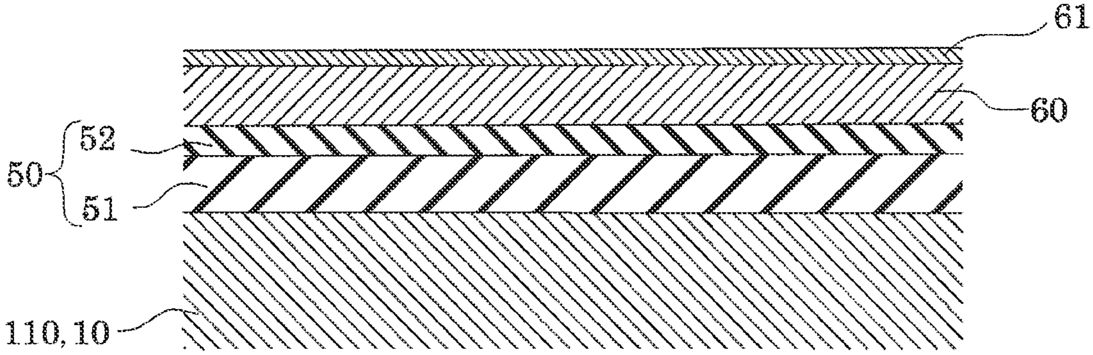
FIG. 5 is a cross-sectional view illustrating a method of producing the recording head according to the first embodiment.

First, as illustrated in FIG. 5, an elastic layer 51 is formed on a channel forming substrate wafer 110, which will become the channel forming substrate 10. In this embodiment, the channel forming substrate wafer 110 is thermally oxidized to form an elastic layer 51 including silicon dioxide ($SiO_2$). The material of the elastic layer 51 should not be limited to this and may be any of the above-listed other materials. The method of forming the elastic layer 51 should not be limited to thermal oxidation and may be puttering, CVD, spin coating, or other methods.

Next, as illustrated in FIG. 5, an insulating layer 52 including zirconium oxide is formed on the elastic layer 51. Thus, the vibration plate 50 having an elastic layer 51 and the insulating layer 52 is formed. The material of the insulating layer 52 should not be limited to zirconium oxide and may be silicon nitride ($Si_3N_4$), titanium oxide ($TiO_2$), aluminum oxide ($Al_2O_3$), hafnium oxide ($HfO_2$), magnesium oxide (MgO), lanthanum aluminate ($LaAlO_3$), or other materials. Examples of the method of forming the insulating layer 52 include sputtering, CVD, and vapor deposition.

Next, as illustrated in FIG. 5, the first electrode 60 is formed over the entire surface of the insulating layer 52. The first electrode 60 may be formed of any material. However, when the piezoelectric layer 70 is formed of lead zirconate titanate (PZT), a material whose conductivity is less likely to be changed by diffusion of lead oxide may be employed. Examples of the material of the first electrode 60 include platinum and iridium. The first electrode 60 may be formed by sputtering, physical vapor deposition PVD, or other methods.

Next, as illustrated in FIG. 5, a first seed layer 61 including titanium (Ti) is formed on the first electrode 60. The first seed layer 61 may be amorphous. Specifically, the X-ray diffraction intensity of the first seed layer 61, especially the X-ray diffraction intensity (XRD intensity) of the (002) plane may be virtually zero. The first seed layer 61 that is amorphous has a higher film density, and thus the oxidized layer formed as the surface layer has a smaller thickness. This enables the crystal of the piezoelectric layer 70 to grow more successfully.

The first seed layer 61 formed on the first electrode 60 as described above enables the preferential orientation of the piezoelectric layer 70 to be controlled to (100) or (111) when the piezoelectric layer 70 is formed on the first electrode 60 with the first seed layer 61 therebetween in a later process. This results in formation of the piezoelectric layer 70 suitably used as an electromechanical transducer. The first seed layer 61 functions as a seed that promotes crystallization of the piezoelectric layer 70. At least a portion of the first seed layer 61 diffuses into the piezoelectric layer 70 after heat treatment of the piezoelectric layer 70. Thus, in FIG. 4, the first seed layer 61 is donated as S—Ti.

The first electrode 60 and the first seed layer 61 may be formed by DC magnetron sputtering method, for example.

Figure 6:
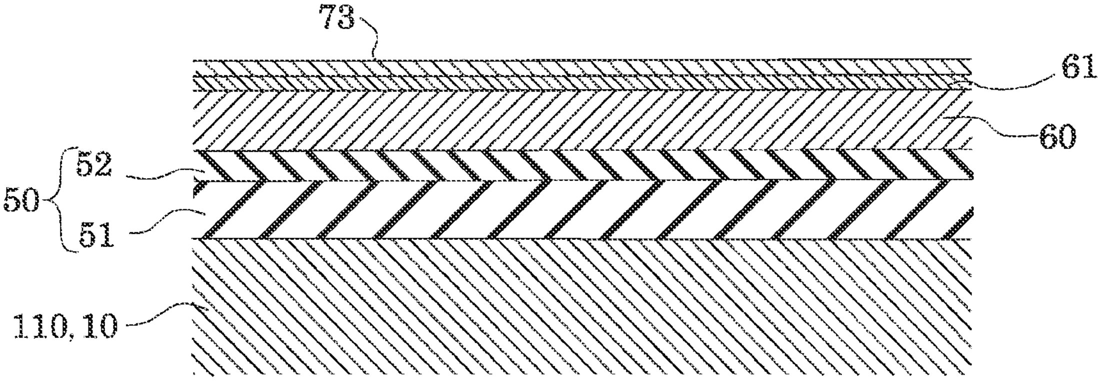
FIG. 6 is a cross-sectional view illustrating a method of producing the recording head according to the first embodiment.

A method of forming the piezoelectric layer 70 specifically includes, as illustrated in FIG. 6, forming a piezoelectric precursor layer 73, which is a PZT precursor layer, on the first electrode 60 (first seed layer 61). In other words, a sol (solution) containing titanium (Ti), zirconium (Zr), and lead (Pb) is applied on the channel forming substrate 10 having the first electrode 60 (coating process). Then, the piezoelectric precursor layer 73 is heated to a predetermined temperature and dried for a certain period of time (drying process). For example, the piezoelectric precursor layer 73 may be dried by being held at 150 to 170° C. for 5 to 10 minutes.

Next, the dried piezoelectric precursor layer 73 is heated to a predetermined temperature and held for a certain period of time to be degreased (degreasing process). For example, in this embodiment, the piezoelectric precursor layer 73 was degreased by being heated to a temperature of about 300 to 400° C. and held for about 5 to 10 minutes. The term "degreasing" here refers to the removal of organic components contained in the piezoelectric precursor layer 73 as $NO_2$, $CO_2$, and $H_2O$, for example. In the degreasing process, the temperature increase rate may be 15° C./sec or higher.

Figure 7:
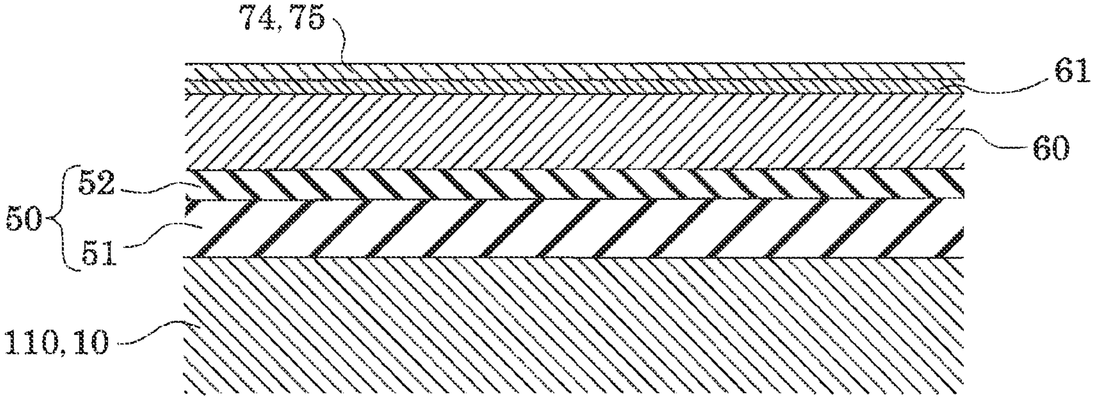
FIG. 7 is a cross-sectional view illustrating a method of producing the recording head according to the first embodiment.

Next, as illustrated in FIG. 7, the piezoelectric precursor layer 73 is heated to a predetermined temperature and held for a certain period of time to be crystallized, and thus the piezoelectric layer 74 is formed (heat treatment process). In this embodiment, the first layer of piezoelectric layer 74 is the first piezoelectric layer 75. In this heat treatment process, the piezoelectric precursor layer 73 may be heated to 680 to 900° C. In this embodiment, the piezoelectric precursor layer 73 was heated at 700° C. for 5 minutes to form the piezoelectric layer 74. In the heat treatment process, the temperature increase rate may be 90 to 110° C./sec. This can produce a piezoelectric layer 74 having superior properties.

The sol used to form the first piezoelectric layer 75 has a higher ratio of titanium to zirconium than the sol used to form a second piezoelectric layer 76 in a later process. At least a portion of titanium in the first seed layer 61 diffuses into the first piezoelectric layer 75 (first layer of the piezoelectric layer 74) during heat treatment of the first piezoelectric layer 75.

Examples of the heater that is used in the drying, degreasing, and heat treatment processes include a hot plate and a Rapid Thermal Processing (RTP) device that heats by means of an infrared emitting lamp.

Figure 8:
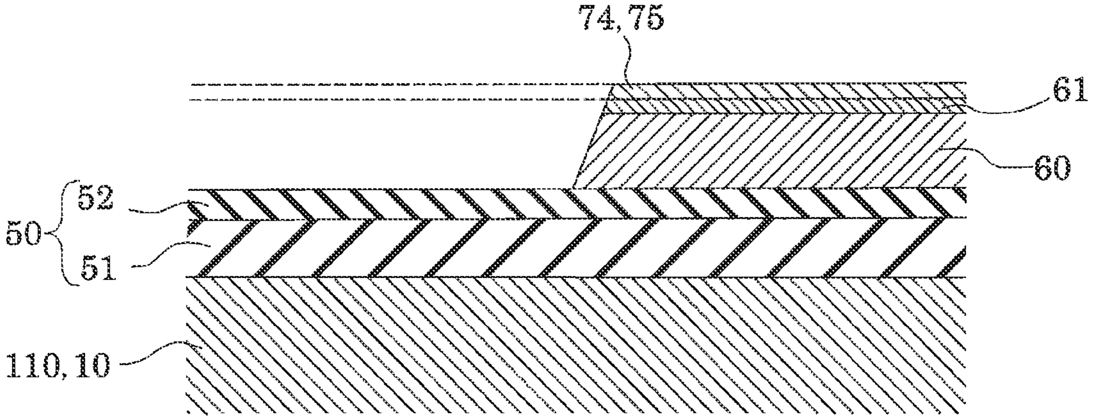
FIG. 8 is a cross-sectional view illustrating a method of producing the recording head according to the first embodiment.

Next, as illustrated in FIG. 8, after the formation of the first piezoelectric layer 75 on the first electrode 60, the first electrode 60 and the first piezoelectric layer 75 are patterned simultaneously to have a tapered side surface. The first electrode 60 and the first piezoelectric layer 75 may be pattered by dry etching such as ion milling.

For example, if the first layer of the piezoelectric layer 74 is formed after the patterning of the first seed layer 61 on the first electrode 60, the first seed layer 61 is altered due to the photographic process, ion milling, and ashing conducted for patterning the first electrode 60. A piezoelectric layer 74 that is formed on the altered first seed layer 61 will have poor crystallinity, and the crystal growth of the second and subsequent layers of the piezoelectric layer 74 is also affected by the crystalline state of the first layer of the piezoelectric layer 74. As a result, it is impossible to form a piezoelectric layer 70 having high crystallinity. Furthermore, during heat treatment of the first layer of the piezoelectric layer 74 after the patterning of the first electrode 60, areas having the first electrode 60 as an underlying layer and areas not having the first electrode 60 coexist. This does not allow the first layer of the piezoelectric layer 74 to be uniformly heated due to the different underlying layers, resulting in varied crystallinity.

In contrast, when the first layer of the piezoelectric layer 74 and the first electrode 60 are patterned simultaneously after formation of the first layer of the piezoelectric layer 74 on the first electrode 60, the piezoelectric layer 70 having high crystallinity can be formed.

Figure 9:
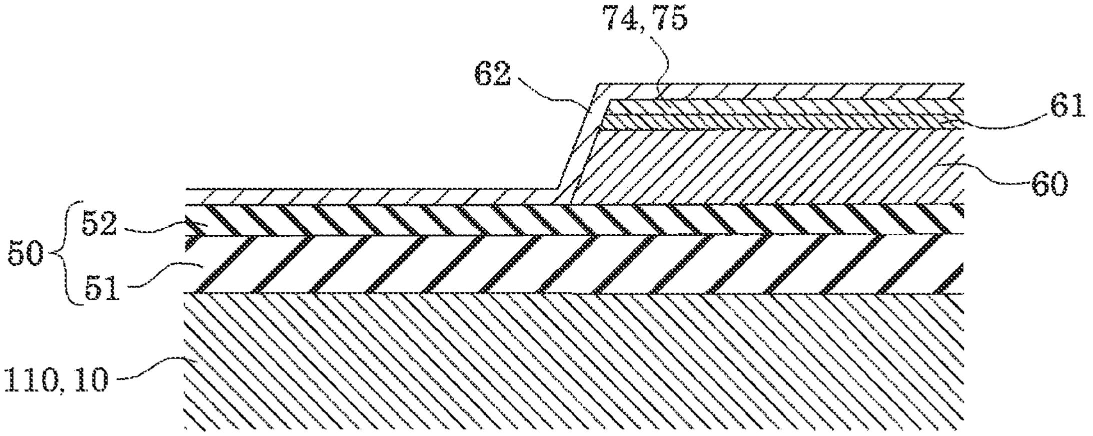
FIG. 9 is a cross-sectional view illustrating a method of producing the recording head according to the first embodiment.
Figure 10:
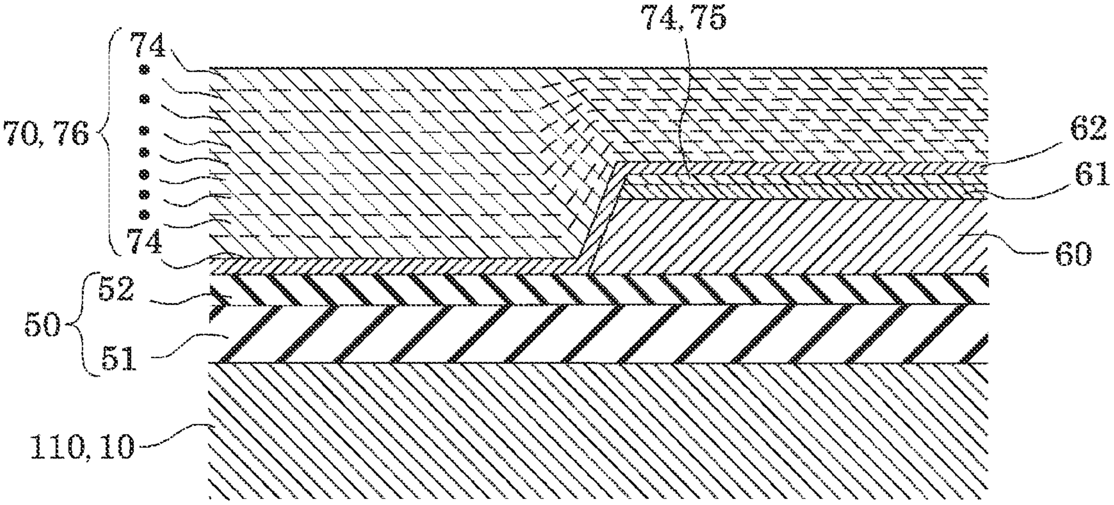
FIG. 10 is a cross-sectional view illustrating a method of producing the recording head according to the first embodiment.

Next, as illustrated in FIG. 9, a second seed layer 62 is formed on the entire surface of the channel forming substrate wafer 110 having the first piezoelectric layer 75, and then the above-described process of forming the piezoelectric layer, which involves coating, drying, degreasing, and heat treatment is repeated multiple times to form multiple layers of the piezoelectric layer 74 as illustrated in FIG. 10. The piezoelectric layers 74 formed on the first piezoelectric layer 75 constitute the second piezoelectric layer 76.

The ratio of titanium to zirconium may be different for the sol used to form the first piezoelectric layer 75 and the sol used to form the second piezoelectric layer 76. This may result in differences in crystal orientation and crystal grain size between the first piezoelectric layer 75 and the second piezoelectric layer 76.

The second seed layer 62 may include titanium (Ti) as the first seed layer 61 or a conductive oxide metal such as titanium oxide ($TiO_2$). For example, if the second seed layer 62 includes titanium, at least a portion of the second seed layer 62 will diffuse into the second piezoelectric layer 76 when the second piezoelectric layer 76 is heat-treated. Thus, in FIG. 4, the second seed layer 62 is denoted as M-Ti.

The second piezoelectric layer 76 formed in this way also has the crystallinity of the first piezoelectric layer 75 but forms a stepped structure in which crystals are separated from crystals of the first piezoelectric layer 75, because the crystals of the second piezoelectric layer 76 grow with the second seed layer 62 being located between the first and second piezoelectric layers 75 and 76.

In this configuration, the first piezoelectric layer 75 located between the second piezoelectric layer 76 and the first electrode 60 functions as an orientation control layer that controls the orientation of the second piezoelectric layer 76, and the second piezoelectric layer 76 constitutes the piezoelectric layer 70. The first piezoelectric layer 75 that is patterned together with the first electrode 60 is included in the active portion 310, not included in the non-active portion 330.

In this embodiment, one layer of the piezoelectric layer 74 is formed as the first piezoelectric layer 75, and nine layers of the piezoelectric layer 74 are formed as the second piezoelectric layer 76. Here, for example, if the thickness of the sol applied each time is 0.1 μm, the total thickness of the piezoelectric layer 70 is about 1.1 μm.

Figure 11:
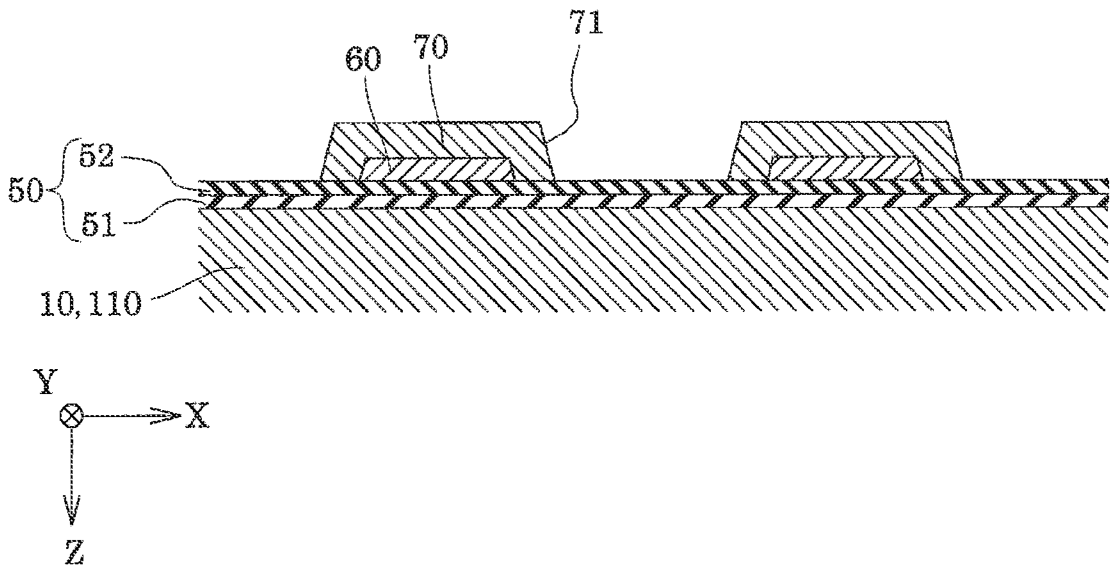
FIG. 11 is a cross-sectional view illustrating a method of producing the recording head according to the first embodiment.

Next, as illustrated in FIG. 11, patterning is performed on the piezoelectric layer 70 in the areas opposed to the pressure chambers 12. In this embodiment, the piezoelectric layer 70 was patterned by "photolithography", in which the piezoelectric layer 70 is etched through a mask having a predetermined shape (not illustrated) formed on the piezoelectric layer 70. Examples of the method of patterning the piezoelectric layer 70 include dry etching such as reactive ion etching and ion milling. The recesses 71 are formed by the patterning on the piezoelectric layer 70.

Figure 12:
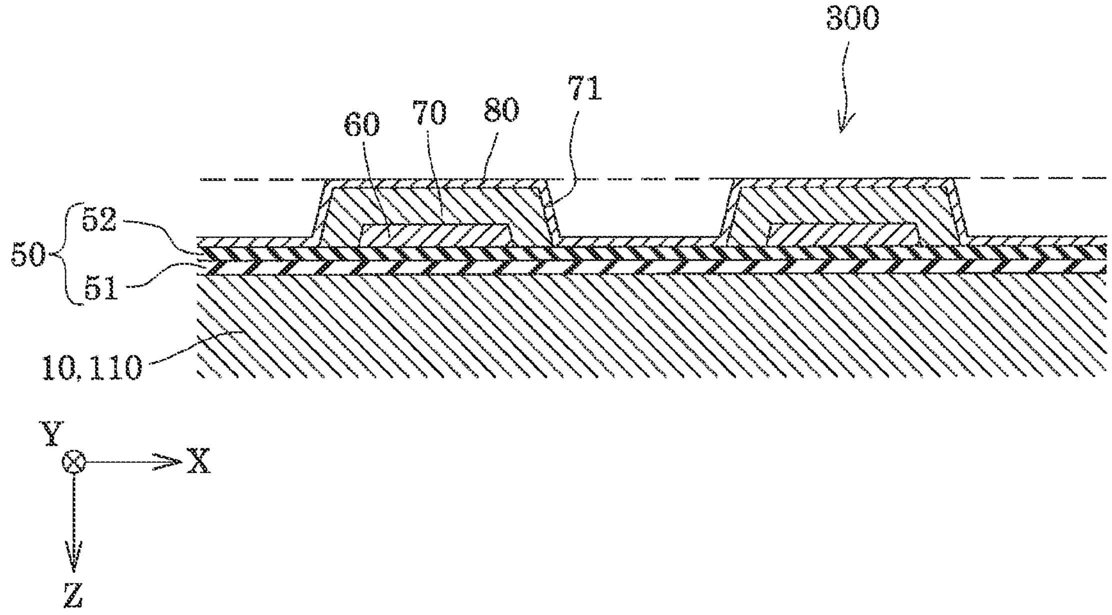
FIG. 12 is a cross-sectional view illustrating a method of producing the recording head according to the first embodiment.

Next, as illustrated in FIG. 12, the second electrode 80 is formed over the piezoelectric layer 70 and the insulating layer 52 and then patterned into a predetermined shape to form the piezoelectric actuator 300. Then, the individual lead electrodes 91 and the common lead electrode 92, which is not illustrated, are formed on the channel forming substrate wafer 110.

Figure 13:
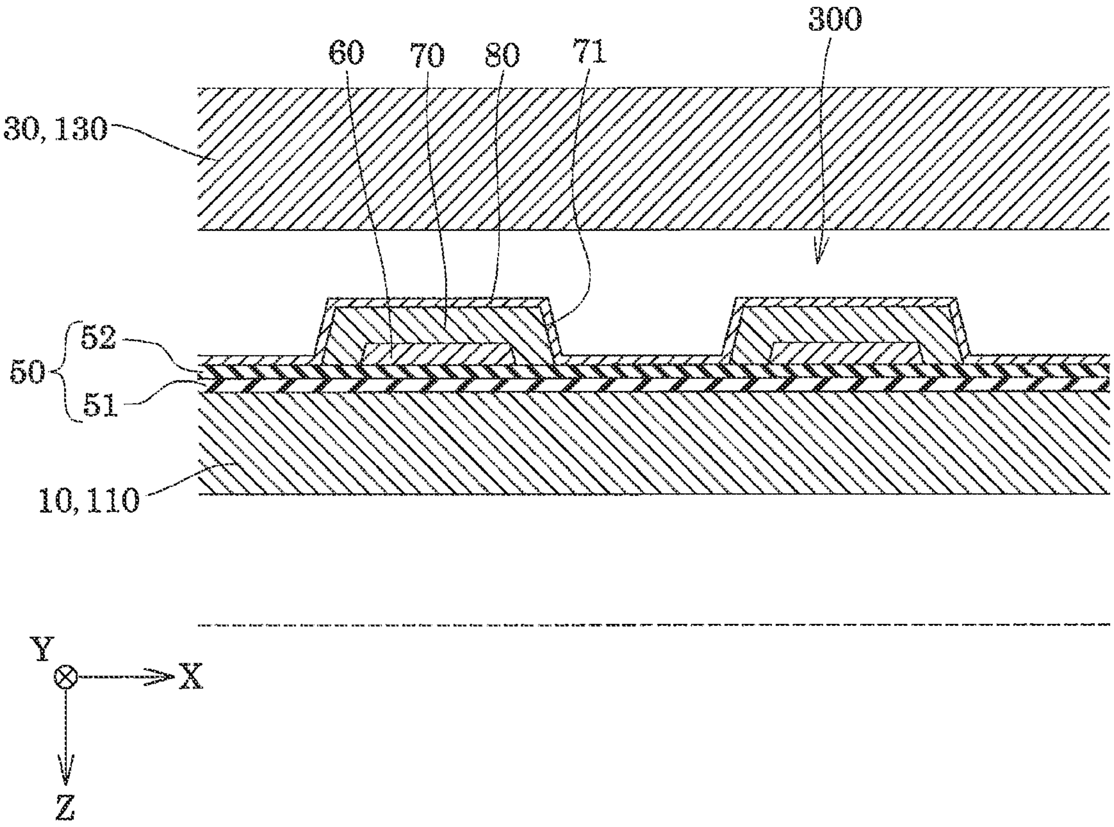
FIG. 13 is a cross-sectional view illustrating a method of producing the recording head according to the first embodiment.

Next, as illustrated in FIG. 13, a protection plate wafer 130, which is a silicon wafer and becomes multiple protection plates 30, is bonded to the surface of the channel forming substrate wafer 110 having the piezoelectric actuator 300, and then the channel forming substrate wafer 110 is made thinner to a predetermined thickness. The protection plate wafer 130 has pre-formed holders 31 in FIG. 3.

Figure 14:
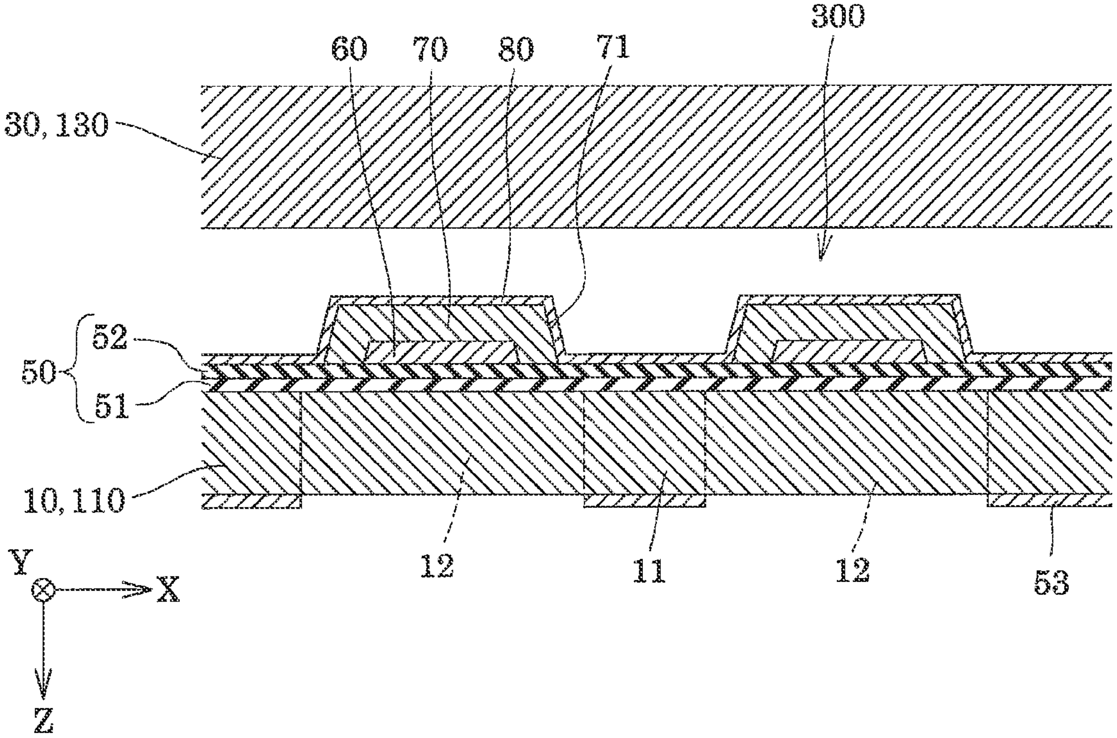
FIG. 14 is a cross-sectional view illustrating a method of producing the recording head according to the first embodiment.
Figure 15:
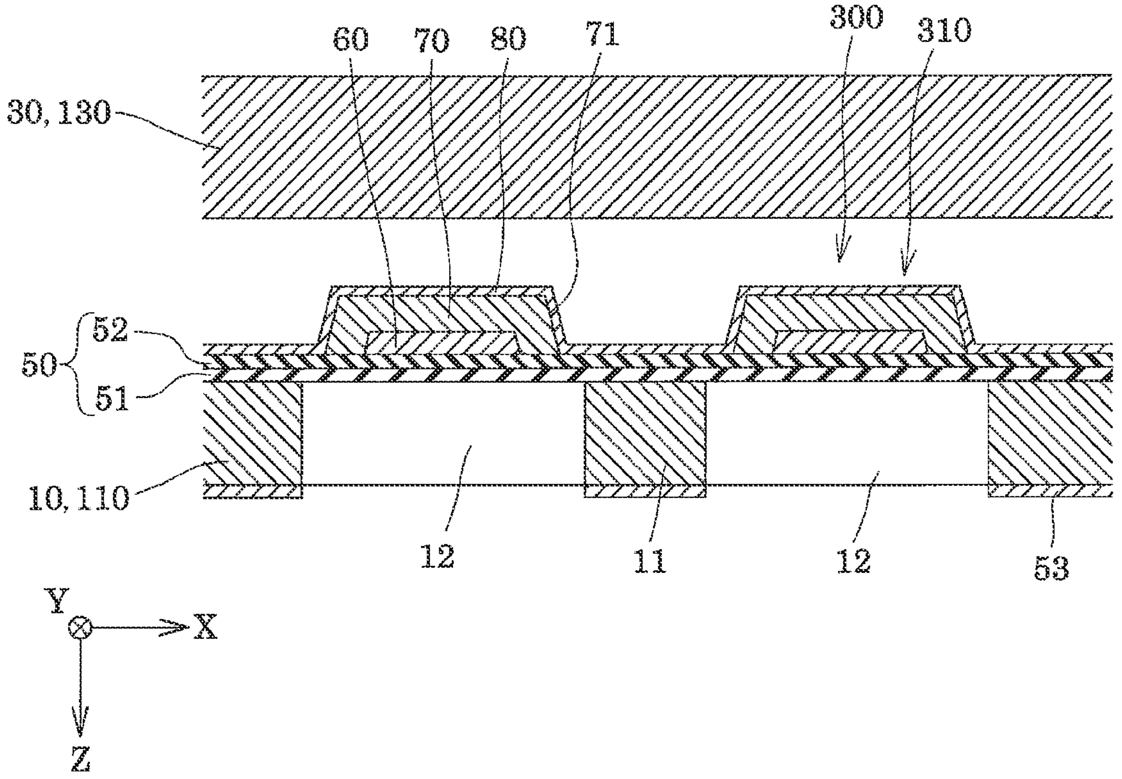
FIG. 15 is a cross-sectional view illustrating a method of producing the recording head according to the first embodiment.

Next, as illustrated in FIG. 14, a mask film 53 is newly formed on the channel forming substrate wafer 110 and then patterned into a predetermined shape. Then, as illustrated in FIG. 15, the channel forming substrate wafer 110 having the mask film 53 is anisotropically etched (wet-etched) with an alkaline solution such as KOH to form the pressure chambers 12 separated by the partition walls 11.

After the above process, unnecessary outer peripheral portions of the channel forming substrate wafer 110 and the protection plate wafer 130 are cut by dicing, for example, and removed. Then, the joined body of the channel forming substrate wafer 110 and the protection plate wafer 130 is divided into single chip-sized channel forming substrates 10 illustrated in FIG. 1. After this process, the communication plate 15, the nozzle plate 20, the casing 40, the compliance plate 45 are attached to the joined body of the protection plate 30 and the channel forming substrate 10 to form the recording head 1 according to this embodiment.

In the above-described recording head 1, the first electrodes 60 are individual electrodes, which are cut pieces provided for the respective pressure chambers 12 and provided independently for the respective active portions 310, and the second electrode 80 is the common electrode, which is provided over the pressure chambers 12 arranged in the X direction, or in the width direction of the pressure chamber 12.

Here, when viewed in the Z direction, which is the first direction, the boundary area between the active portion 310, which overlaps the pressure chamber 12, the first electrode 60 and the second electrode 80, and the non-active portion 330, which does not overlap the first electrode 60, the piezoelectric layer 70, and the second electrode 80, exists at both ends in the X direction, or the width direction, of the first electrode 60, which is an individual electrode, or at one of the ends in the Y direction, or the longitudinal direction, in this embodiment.

Figure 16:
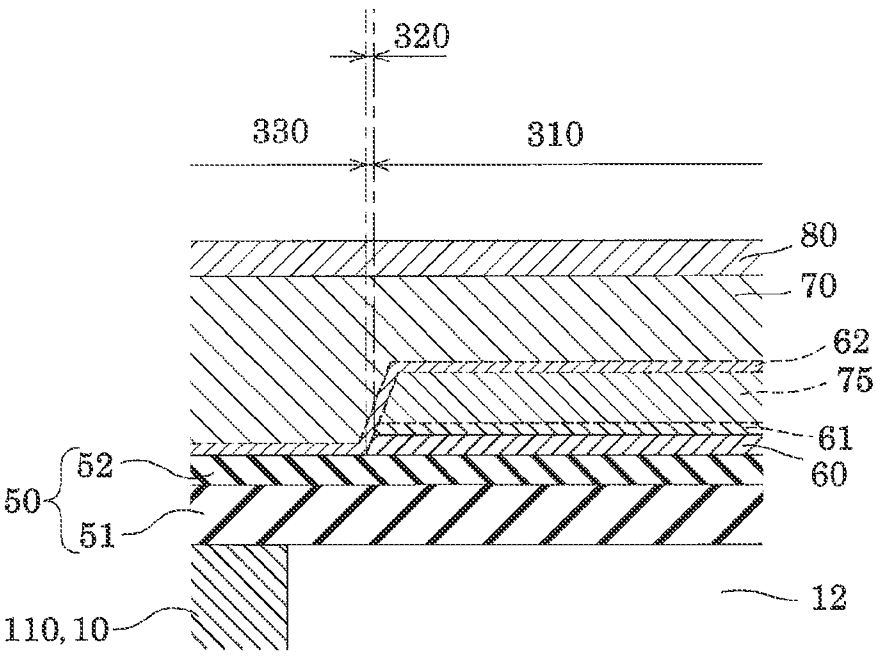
FIG. 16 is a partial cross-sectional view illustrating the recording head according to the first embodiment.

FIG. 16 schematically illustrates a partial structure of the boundary area. As illustrated in FIG. 16, the first electrode 60, which is the individual electrode, has a tapered side surface, and thus the crystals of the piezoelectric layer 70 grow in a tilted direction along the tapered surface. Thus, as illustrated in FIG. 16, the active portion 310 is a portion of the piezoelectric layer 70 that overlaps a portion of the first electrode 60 other than the tapered surface and the second electrode 80, the non-active portion 330 is a portion of the piezoelectric layer 70 that does not overlap at least one of the first electrode 60 and the second electrode 80, and the tapered portion 320 is a portion of the piezoelectric layer 70 grown on the tapered surface of the first electrode 60 and located between the first electrode 60 and the second electrode 80.

The piezoelectric layer 70 of the piezoelectric actuator 300 of this embodiment continuously extends from the active portion 310 to the tapered portion 320 and further to the non-active portion 330. The crystal grain size of the piezoelectric material forming the piezoelectric layer 70 is larger in the non-active portion 330 than in the active portion 310.

This increases the voids between the crystal grains and lowers the crystal density in the piezoelectric material forming the piezoelectric layer 70 in the arms of the piezoelectric actuator 300. Thus, the stiffness of the arms of the piezoelectric layer 70 decreases, and thus the residual strain caused by continuous drive is reduced. This can reduce the possibility that fatigue deformation (deflection) of the vibration plate will increase and the piezoelectric material itself will have crack, eliminating the risk of significant deterioration in discharge characteristics and crack resistance caused by repeated voltage application for a long period of time.

Furthermore, in this embodiment, the tapered portion 320 exists between the non-active portion 330 in the arm and the active portion 310 in the middle. The crystal grain size of the piezoelectric material in the tapered portion 320 is intermediate between that in the non-active portion 330 and that in the active portion 310. This further reduces cracks.

As described above, this embodiment includes the tapered portion 320, which functions as the second active portion, between the active portion 310 and the non-active portion 330. The crystal grain size of the piezoelectric material that forms the piezoelectric layer 70 in the tapered portion 320 is larger than that in the active portion 310 and smaller than that in the non-active portion 330. The thickness of the first electrode 60 at the tapered portion 320 gradually decreases from the active portion 310 toward the non-active portion 330.

This prevents a sharp change in grain size from the active portion 310 to the non-active portion 330, reducing generation of large voids and cracks caused by such a sharp change.

In this embodiment, the second seed layer 62 is thinner in the non-active portion 330 than in the active portion 310 to make the crystal grain size of the piezoelectric material forming the piezoelectric layer 70 larger in the non-active portion 330 than in the active portion 310. This makes the crystal growth of the piezoelectric material in the non-active portion 330 relatively free, allowing the crystal grain size to proportionally increase.

The thickness of the second seed layer 62 on the tapered surface of the first electrode 60 may be the same as that on the first electrode 60 or may gradually decrease toward the outer edge of the first electrode 60. Alternatively, the second seed layer 62 in the non-active portion 330 may be eliminated, instead of being made thinner that than the second seed layer 62 in the active portion 310.

In this embodiment, the active portion 310 includes the first piezoelectric layer 75, which functions as the orientation control layer, between the first electrode 60 and the piezoelectric layer 70, but the non-active portion 330 does not include the first piezoelectric layer 75. This is one of the factors that make the crystal grain size of the piezoelectric layer 70 to be larger in the non-active portion 330 than in the active portion 310.

Here, the piezoelectric layer 70 of the active portion 310 may be thicker than the first piezoelectric layer 75. This makes a difference in crystal grain size between the piezoelectric material forming the piezoelectric layer 70 in the active portion 310 and the piezoelectric material forming the piezoelectric layer 70 in the non-active portion 330. When the piezoelectric layer 70 includes the multiple piezoelectric layers 74 stacked in layers, the thickness of one piezoelectric layer 74 may be larger than the first piezoelectric layer 75.

In an example of the present embodiment, the piezoelectric layer 70 in the active portion 310 and the piezoelectric layer 70 in the non-active portion 330 are formed simultaneously. However, the layer formation process of the piezoelectric layer 70 in the active portion 310 and the layer formation process of the non-active portion 330 may be separately performed to vary the crystal grain size in the active portion 310 and that in the non-active portion 330. In this case, the sol to be applied may be varied in composition between the active portion 310 and the non-active portion 330, or the temperature increase rate or heating temperature in the drying, degreasing, and heat treatment processes may be varied. This also results in a difference in crystal grain size between the piezoelectric material forming the piezoelectric layer 70 in the active portion 310 and that in the non-active portion 330. In another example, during the layer formation process, ions may be implanted into one of the active portion 310 and the non-active portion 330 to make the subsequent crystal growth in the active portion 310 and the non-active portion 330 different. This results in a difference in crystal grain size between the piezoelectric material forming the piezoelectric layer 70 in the active portion 310 and that in the non-active portion 330.

The above-described method in which the crystal growth environment is varied is a relatively easy way to vary the crystal grain size. However, the present disclosure should not be limited to this and may employ any method that can make the crystal grain size of the piezoelectric material larger in the non-operative portion 330 adjacent to the active portion 310 than in the non-active portion 330.

For example, the composition of the piezoelectric material forming the piezoelectric layer 70, i.e., the ratio of Ti to Zr, may be varied to vary the crystal grain size.

When the crystal grain size in the non-active portion 330 is larger than that in the active portion 310, the distribution (variation) of the crystal grain size of the piezoelectric material in the non-active portion 330 may be larger than that in the active portion 310.

When the crystal grain size is larger in the non-active portion 330, which is the arm, than in the active portion 310, the voids between the crystal grains proportionally increase, resulting in a decrease in crystal density. However, the decrease in the crystal density can be prevented by making the distribution of the crystal grain size in the non-active portion 330 larger than that in the active portion 310, because the number of small crystal grains in the non-active portion 330 increases. This prevents an excessive decrease in crystal density caused by the increase in crystal grain size in the non-active portion 330, thus preventing cracks. Furthermore, the presence of crystals having small grain size prevents crack growth when slippage occurs between crystals having large grain size.

In this disclosure, "crystal grain size" refers to the average of the crystal grain sizes of the piezoelectric material. The crystal grain size is determined, for example, by measuring the diameter of all crystal grains in a 1-μm square observed in the X or Y direction in a photograph taken by transmission electron microscopy (TEM) at a magnification of few tens of thousands of times, and the average value is the crystal grain size. When the width of the tapered portion 320 is smaller than 1 μm, the diameter of the crystal grains observed only in the tapered portion 320 is measured, and the average value can be used as the crystal grain size.

Example 1

Figure 17:
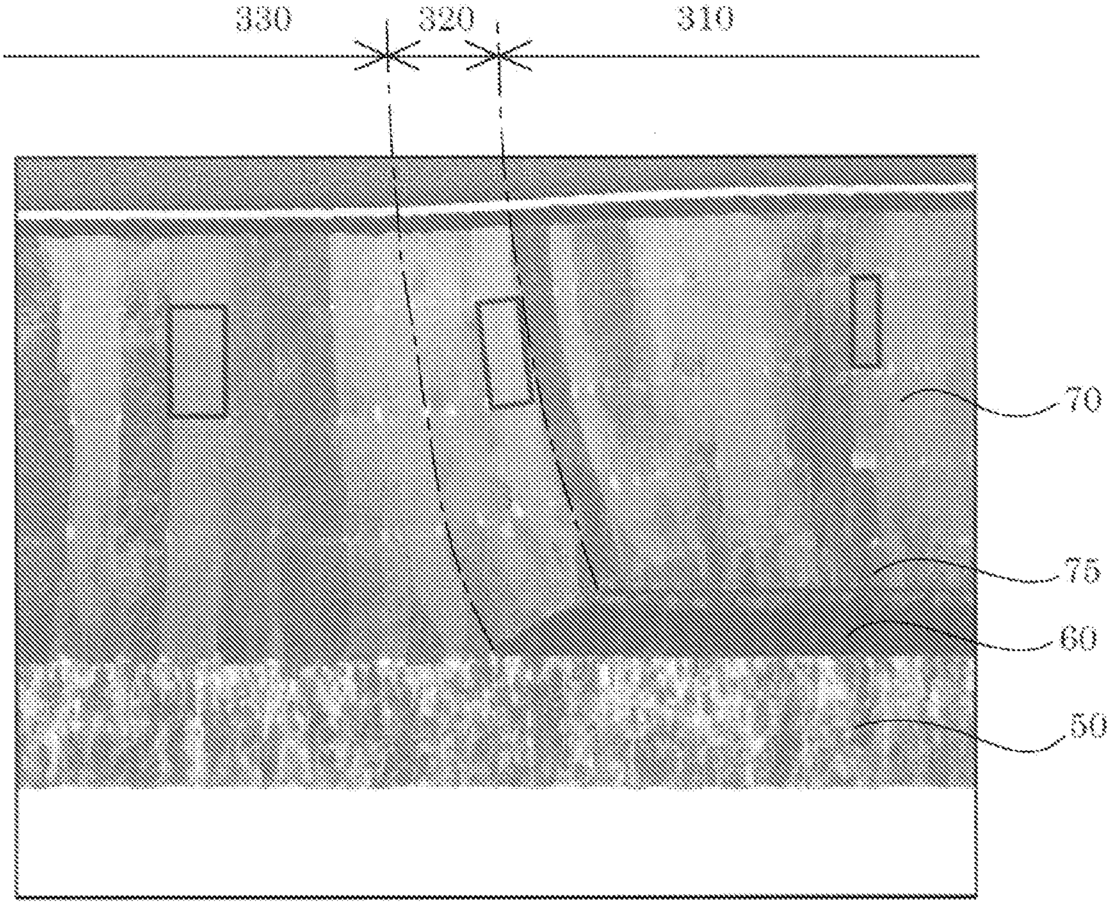
FIG. 17 is a TEM image of Example 1.

In the above-described embodiment, FIG. 17 shows an image of a cross-section of the portion corresponding to FIG. 16 taken in the thickness direction and magnified by TEM at a magnification 40000 times.

Figure 18:
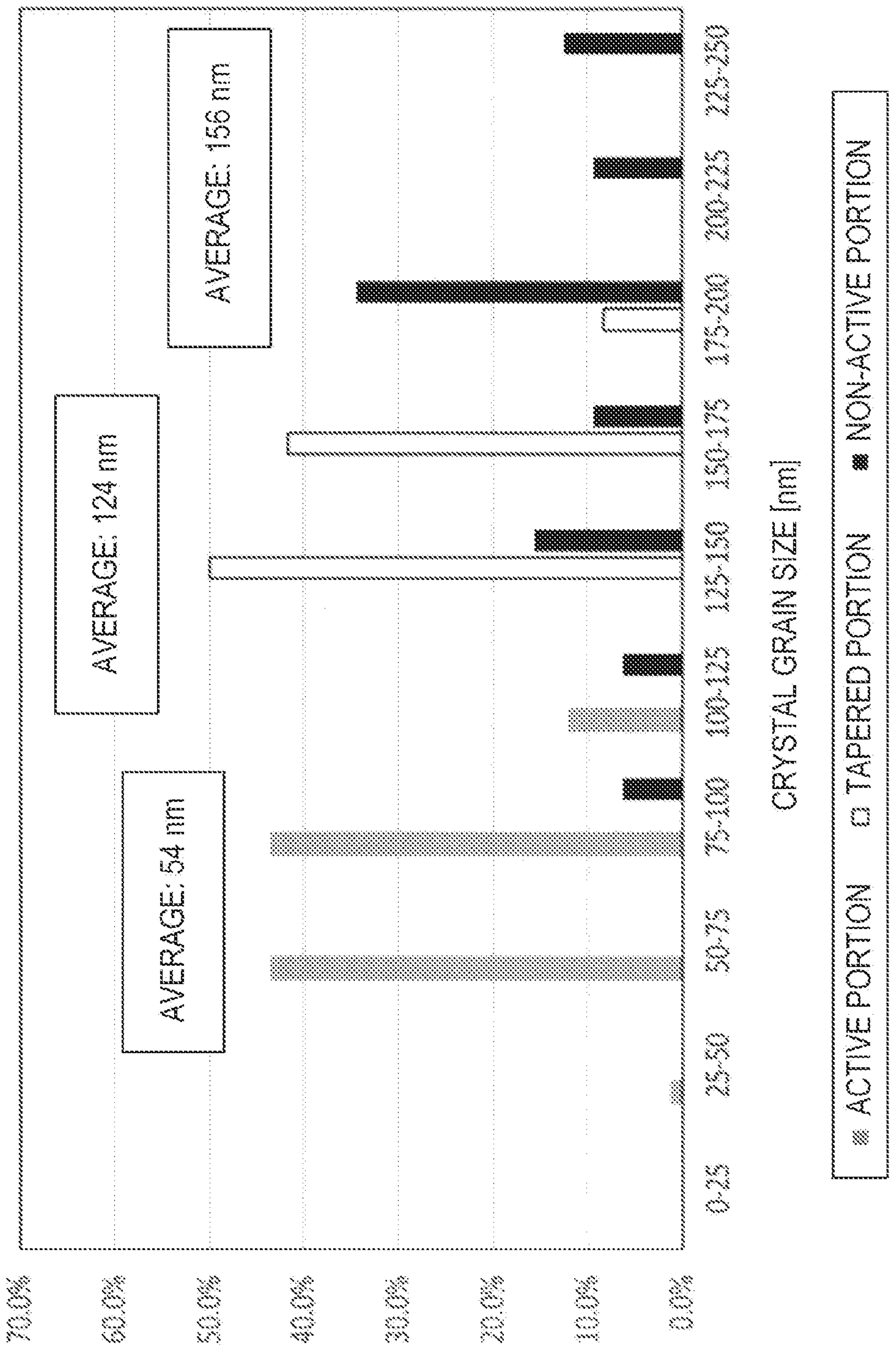
FIG. 18 is a graph showing crystal grain size distribution of Example 1.
Figure 19:
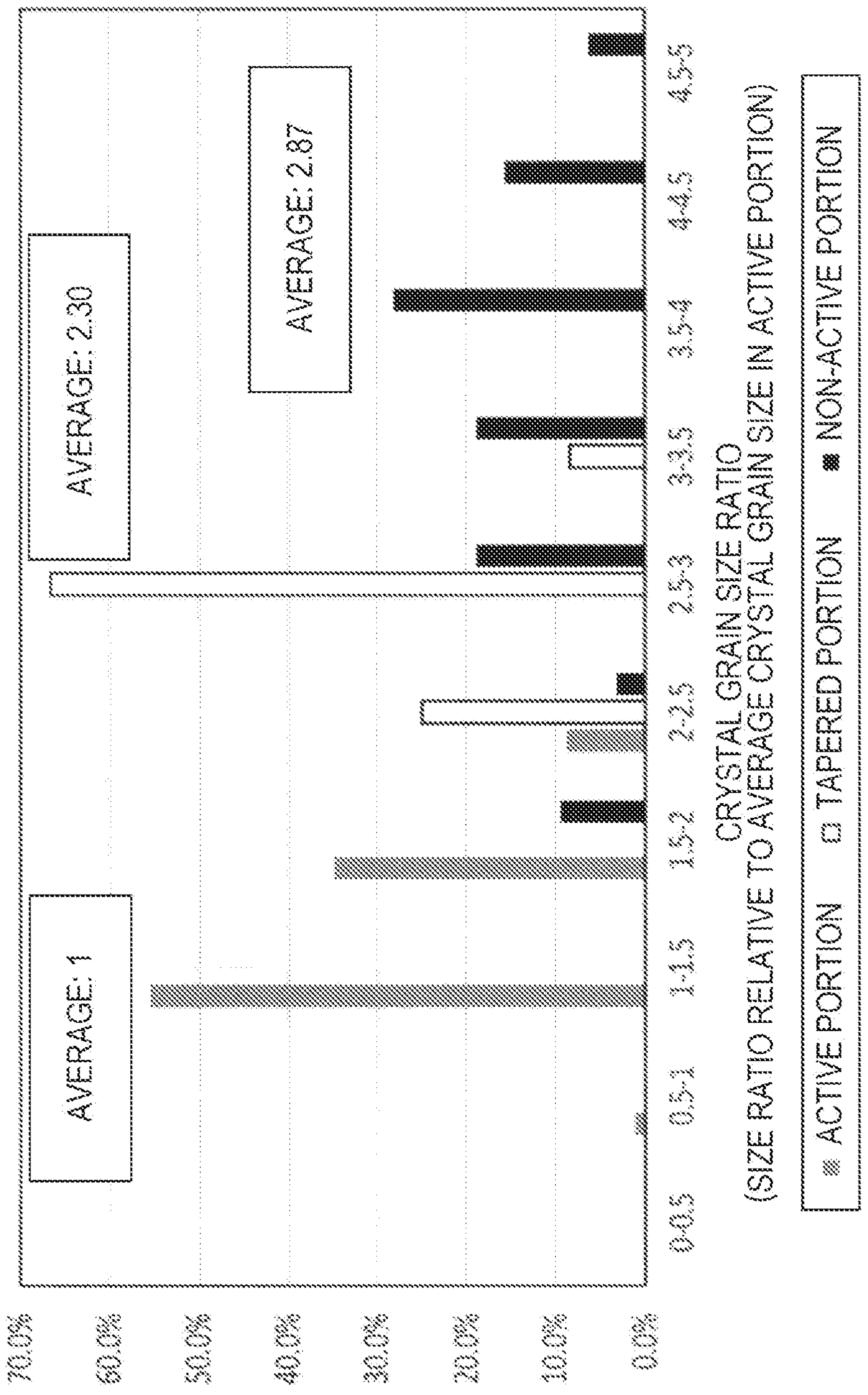
FIG. 19 is a graph showing crystal grain size ratio distribution of Example 1.

FIGS. 18 and 19 indicate results of crystal grain size measurement in a predetermined area of the active portion 310, the tapered portion 320, and the non-active portion 330.

FIG. 18 shows the crystal grain size distribution in the active portion 310, the tapered portion 320, and the non-active portion 330. It was found from FIG. 18 that the average crystal grain size in the active portion 310 is 54 nm, the average crystal grain size in the tapered portion 320 is 124 nm, and the average crystal grain size in the non-active portion 330 is 156 nm. The crystal grain size in the non-active portion 330 is larger than that in the active portion 310, and the crystal grain size in the tapered portion 320 is intermediate between that in the active portion 310 and that in the non-active portion 330. It was also confirmed that the crystal grain size distribution (variation) in the non-active portion 330 is larger, about two times larger, than that in the active portion 310 and that in the tapered portion 320.

FIG. 19 is a graph showing crystal grain size ratios in which the average crystal grain size in the active portion 310, i.e., 54 nm, is taken as 1. When the average crystal grain size in the active portion 310 is taken as 1, the average crystal grain size ratio of the tapered portion 320 is 2.30, and the average crystal grain size ratio of the non-active portion 330 is 2.87.

As described above, the ink jet recording head 1, which is an example of the piezoelectric device according to the present embodiment, includes the vibration plate 50, and the piezoelectric actuator 300 including the first electrode 60, the piezoelectric layer 70, and the second electrode 80, on the vibration plate 50. The piezoelectric layer 70 of the piezoelectric actuator 300 extends continuously from the active portion 310 to the tapered portion 320, further to the non-active portion 330. The crystal grain size of the piezoelectric material forming the piezoelectric layer 70 is larger in the non-active portion 330 than in the active portion 310.

This increases the voids between the crystal grains and lowers the crystal density in the piezoelectric material forming the piezoelectric layer 70 in the arms of the piezoelectric actuator 300. Thus, the stiffness of the arms of the piezoelectric layer 70 decreases, and thus the residual strain caused by continuous drive is reduced. This can reduce the possibility that fatigue deformation (deflection) of the vibration plate will increase and also the piezoelectric material itself will have crack, eliminating the risk of significant deterioration in discharge characteristics caused by repeated voltage application for a long period of time.

Other Embodiments

One embodiment according to the present disclosure was described above. However, the basic configuration of the present disclosure should not be limited to the above-described configuration.

Figure 20:
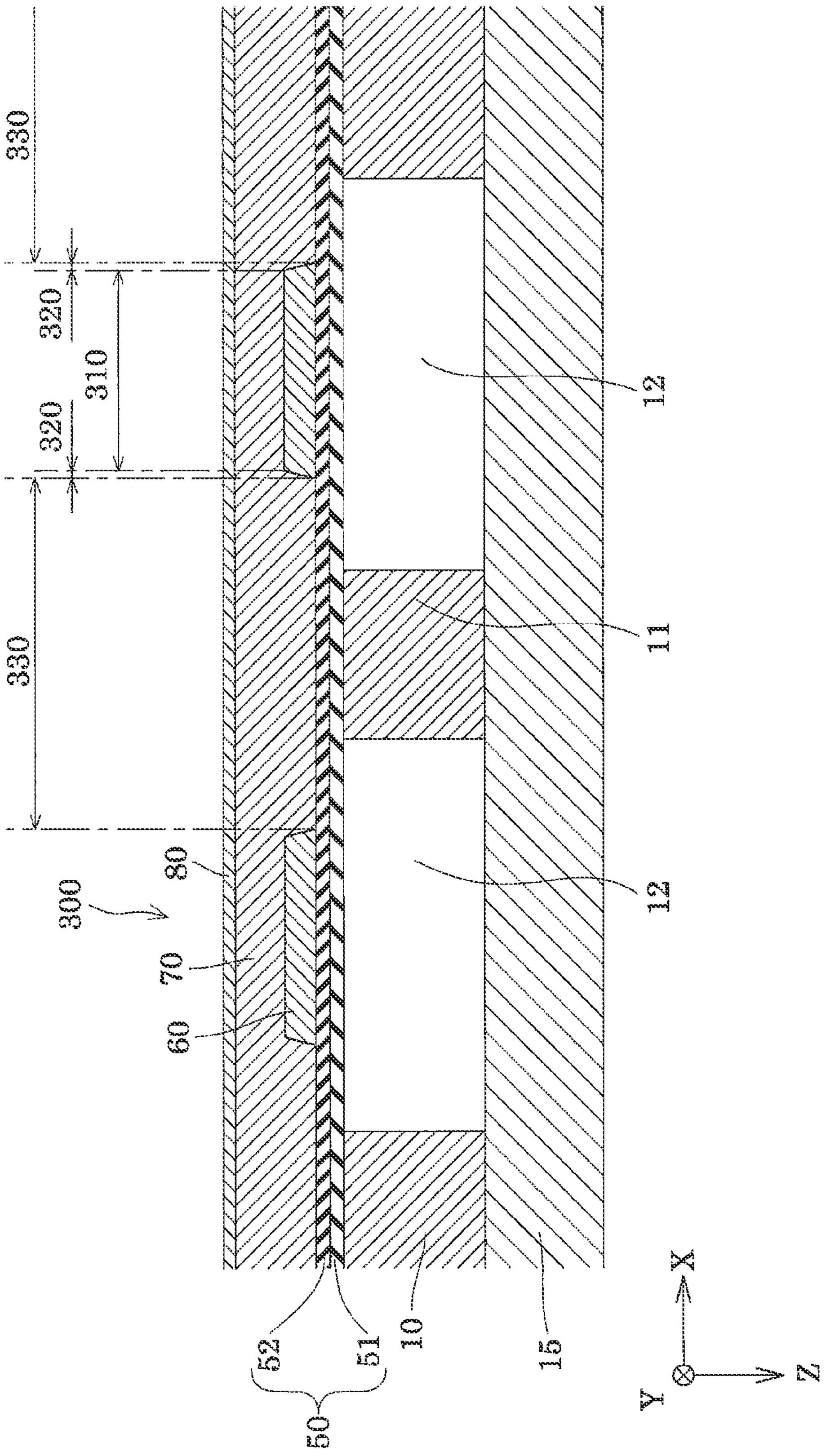
FIG. 20 is a cross-sectional view illustrating a recording head according to another embodiment.

For example, in the above-described first embodiment, as illustrated in FIG. 11, patterning is performed on the piezoelectric layer 70 in the areas opposed to the pressure chambers 12, but the present disclosure should not be limited to this. FIG. 20 illustrates an example where the piezoelectric layer 70 extends continuously in the arrangement direction of the pressure chambers 12 over the multiple pressure chambers 12.

This embodiment includes continuously, in sequence from the inner side, the active portion 310, the tapered portion 320, and the non-active portion 330 at both ends in the X direction, or the width direction of the first electrode 60. In this embodiment, as in the above-described first embodiment, the piezoelectric material forming the piezoelectric layer 70 has a larger crystal grain size in the non-active portion 330 than in the active portion 310, and thus this embodiment has the same effect as that in the first embodiment.

Furthermore, the vibration plate is generally likely to be damaged at the arm between the pressure chamber 12 and the partition wall 11. However, in the present embodiment that includes the continuous piezoelectric layer 70, the effect of crack suppression is more prominent.

Figure 21:
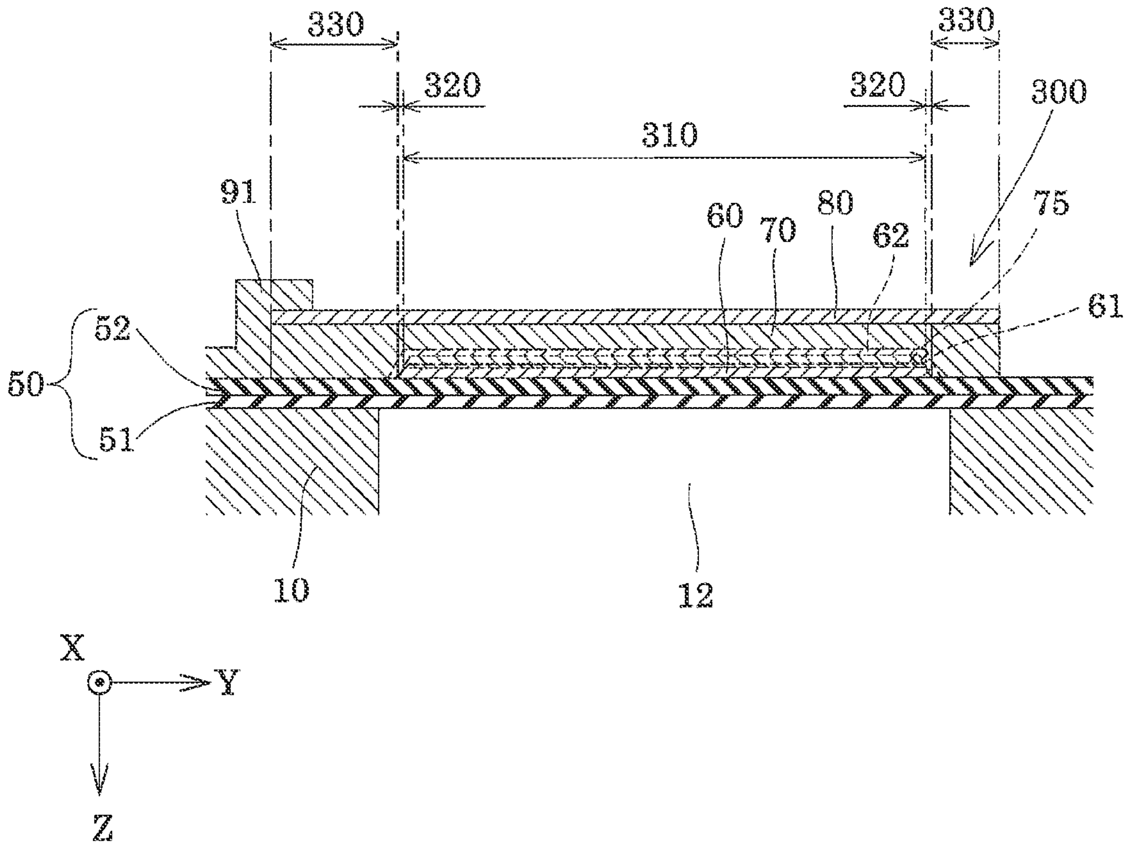
FIG. 21 is a cross-sectional view illustrating a recording head according to another embodiment.
Figure 22:
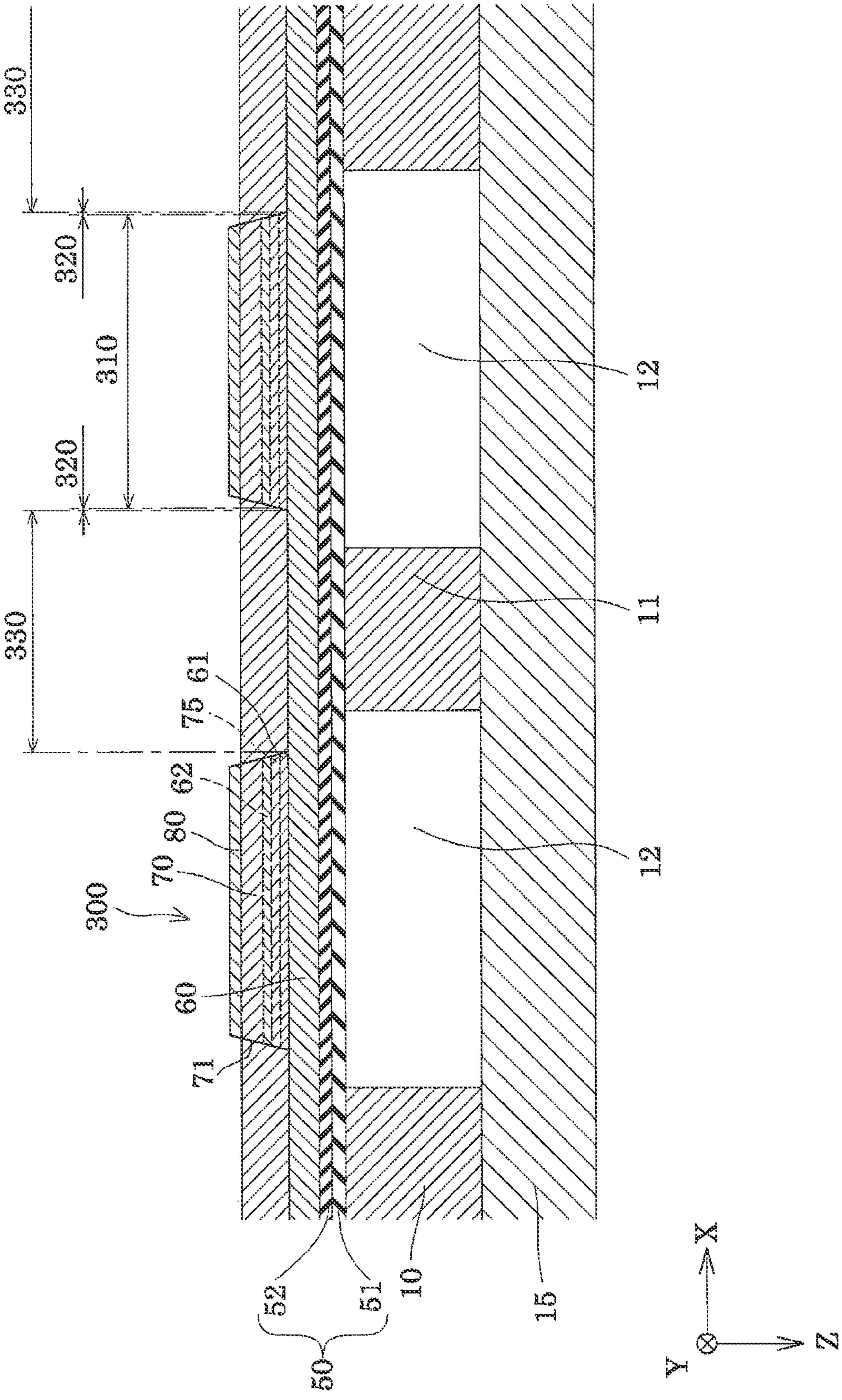
FIG. 22 is a cross-sectional view illustrating a recording head according to another embodiment.

Furthermore, in the above-described first embodiment, the first electrode 60 is an individual electrode provided independently for each of the active portions 310, and the second electrode 80 is a common electrode shared by the multiple active portions 310. However, the present disclosure should not be limited to this. Here, FIGS. 21 and 22 illustrate a configuration that includes the first electrode 60 as the common electrode and the second electrode 80 as the individual electrode. FIG. 21 is a magnified cross-sectional view taken along line corresponding to line III-III and illustrates main components of a recording head including a modified piezoelectric actuator. FIG. 22 is a magnified cross-sectional view taken along line corresponding to line IV-IV and illustrates the main components of the recording head including the modified piezoelectric actuator.

As illustrated in FIGS. 21 and 22, the first electrode 60 has a smaller width in the Y direction than the pressure chamber 12 and continuously extends in the X direction. This first electrode 60 is the common electrode for the active portions 310.

The piezoelectric layer 70 has a larger width in the Y direction than the pressure chamber 12 and extends continuously in the X direction as the first electrode 60. As in the above-described first embodiment, the piezoelectric layer 70 may have a recess 71 in the area overlapping the partition wall 11 when viewed in the Z direction.

The second electrodes 80 are cut pieces provided for the respective pressure chambers 12. The second electrode 80 is the individual electrode for the active portion 310. The second electrodes 80 are cut pieces provided for the respective active portions 310. In this configuration, as in the above-described first embodiment, when viewed in the Z direction, or the first direction, the boundary area between the active portion 310, where the piezoelectric layer 70 overlaps the first electrode 60 and the second electrode 80, and the non-active portion 330, where the first electrode 60, the piezoelectric layer 70, and the second electrode 80 do not overlap each other, exist at both ends in the X direction, or the width direction, of the second electrode 80, which is an individual electrode, and at both ends in the Y direction, or the longitudinal direction, of the second electrode 80.

In this embodiment, as in the above-described embodiment, the piezoelectric material forming the piezoelectric layer 70 has a larger crystal grain size in the non-active portion 330 than in the active portion 310, and thus this embodiment can have the same effect as the above-described embodiment. The piezoelectric layer 70 may be cut into sections for the active portions 310 simultaneously with patterning of the second electrodes 80.

Figure 23:
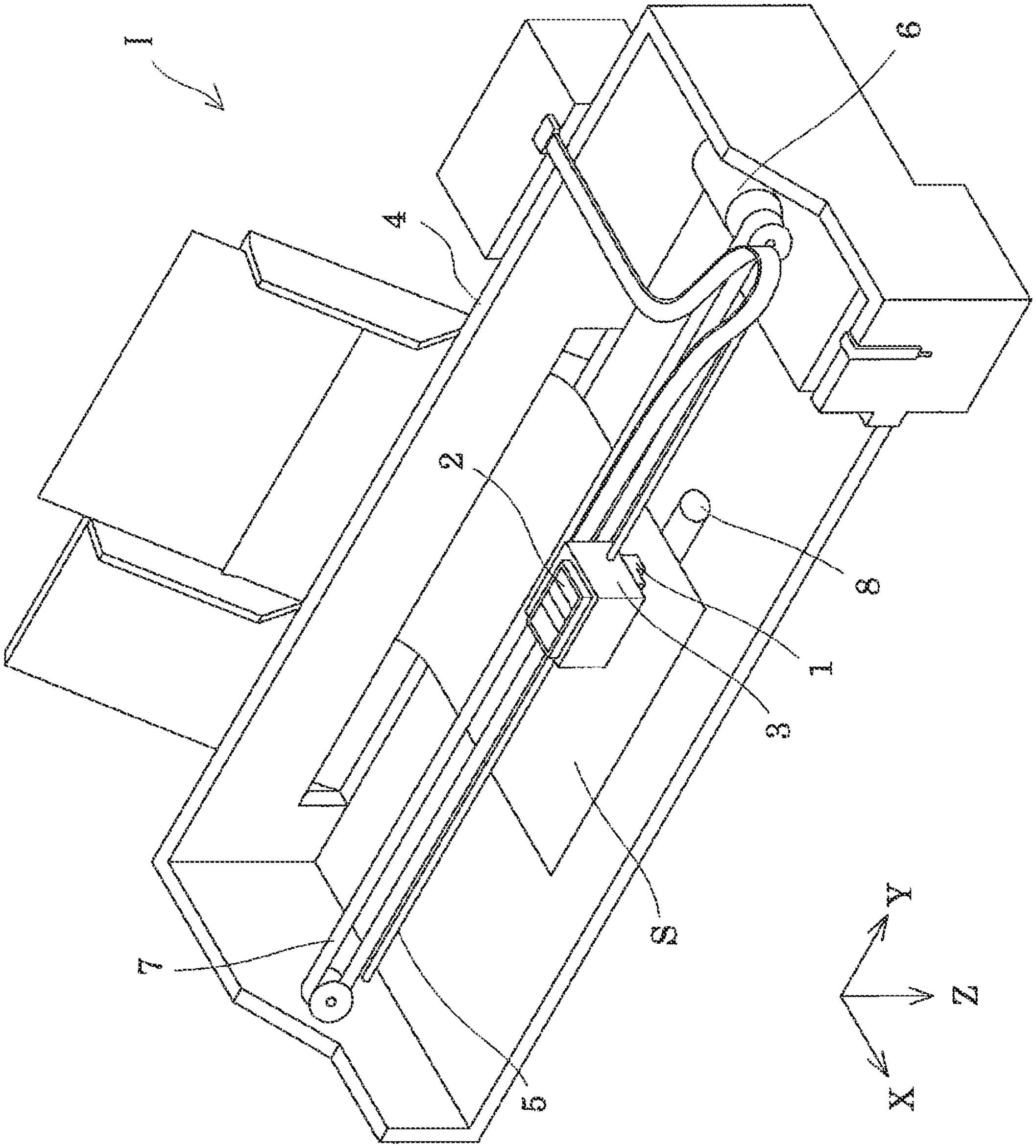
FIG. 23 illustrates a schematic configuration of a recording apparatus according to an embodiment.

The recording head 1 of each of the embodiments is mounted in an ink jet recording apparatus, which is an example of a liquid ejecting apparatus. FIG. 23 is a schematic view illustrating an example of an ink jet recording apparatus I, which is an example of a liquid ejecting apparatus according to an embodiment.

In the ink jet recording apparatus I illustrated in FIG. 23, the recording head 1 has a detachable cartridge 2, which constitutes an ink supplier, and the recording head 1 is mounted on a carriage 3. The carriage 3 having the recording head 1 is freely movable in the axial direction of a carriage shaft 5 attached to an apparatus body 4.

The driving force of a drive motor 6 is transmitted to the carriage 3 via gears (not illustrated) and a timing belt 7, moving the carriage 3 having the recording head 1 along the carriage shaft 5. The apparatus body 4 has a transportation roller 8 as a transportation unit, and a recording sheet S, which is a recording medium such as paper, is transported by the transportation roller 8. The transportation unit that transports the recording sheet S should not be limited to the transportation roller and may be, for example, a belt or a drum.

In the ink jet recording apparatus I having such a configuration, when the recording sheet S is being transported in the X direction relative to the recording head 1 and the carriage 3 is being reciprocated in the Y direction against the recording sheet S, the recording head 1 discharges ink droplets onto the entire surface of the recording sheet S, and thus printing is executed.

Furthermore, in the above-described example of the ink jet recording apparatus I, the recording head 1 mounted on the carriage 3 is reciprocated in the Y direction, which is a main scanning direction. However, the present disclosure should not be limited to this. For example, the present disclosure is applicable to a line recording apparatus in which the recording head 1 is fixed and printing is performed by only moving a recording sheet S such as paper in the X direction, which is a sub scanning direction.

In the above-described embodiments, the ink jet recording head is described as an example of the liquid ejecting head, and the ink jet recording apparatus is described as an example of the liquid ejecting apparatus. However, the present disclosure is widely intended for various types of liquid ejecting heads and general liquid ejecting apparatus and is certainly applicable to a liquid ejecting head that ejects liquid other than ink. Examples of the other liquid ejecting heads include various recording heads used in an image forming apparatus such as a printer, a color material ejecting head used to manufacture a color filter such as a liquid crystal display, an electrode material ejecting head used to form an electrode of a display such as an organic EL display and a field-emission display (FED), and a bio-organic material ejecting head used to manufacture biochips. The present disclosure is also applicable to a liquid ejecting apparatus including such a liquid ejecting head.

Supplementary Note

The following describes configurations conceivable from the above-described embodiments. A liquid ejecting head according to a first aspect includes a substrate having pressure chambers in communication with nozzles through which a liquid is ejected, a vibration plate on the substrate, and a piezoelectric actuator including a first electrode, a piezoelectric layer, and a second electrode stacked in a first direction on the vibration plate. The piezoelectric layer of the piezoelectric actuator has an active portion that overlaps the pressure chamber, the first electrode, and the second electrode when viewed in the first direction and a non-active portion that does not overlap at least one of the first electrode and the second electrode when viewed in the first direction. The active portion and the non-active portion are continuously provided in the piezoelectric layer, and a piezoelectric material forming the piezoelectric layer has a larger crystal grain size in the non-active portion than in the active portion. This increases the voids between the crystal grains and lowers the crystal density in the piezoelectric material forming the piezoelectric layer in the arms of the piezoelectric actuator. This reduces the stiffness of the arms of the piezoelectric layer, reducing the residual strain caused by continuous drive. This can reduce the possibility that fatigue deformation (deflection) of the vibration plate will increase and also the piezoelectric material itself will have crack, eliminating the risk of significant deterioration in discharge characteristics caused by repeated voltage application for a long period of time.

In a second aspect according to the first aspect, the crystal grain size of the piezoelectric material forming the piezoelectric layer in the active portion may be smaller than or equal to half the crystal grain size of the piezoelectric material forming the piezoelectric layer in the non-active portion. This can reliably reduce the possibility that fatigue deformation of the piezoelectric material will increase and the piezoelectric material itself will have crack.

In a third aspect according to the first aspect, the crystal grain size of the piezoelectric material forming the piezoelectric layer may be more varied in the non-active portion than in the active portion. This prevents an excessive decrease in crystal density caused by the increase in crystal grain size, thus preventing cracks. Furthermore, the presence of crystals having small grain size prevents crack growth when slippage occurs between crystals having large grain size.

In a fourth aspect according to the first aspect, the liquid ejecting head may further include an orientation control layer that is overlaps in the active portion, not overlap in the non-active portion when viewed in the first direction, and the orientation control layer may be located between the first electrode and the piezoelectric layer in the active portion. This can further increase the difference in crystal grain size of the piezoelectric material forming the piezoelectric layer between the active portion and the non-active portion, resulting in further reduction in generation and growth of cracks.

In a fifth aspect according to the fourth aspect, the piezoelectric layer may be thicker than the orientation control layer in the first direction. This can further increase the difference in crystal grain size of the piezoelectric material forming the piezoelectric layer between the active portion and the non-active portion, resulting in further reduction in generation and growth of cracks.

In a sixth aspect according to the fourth aspect, a piezoelectric material forming the orientation control layer may have a smaller crystal grain size than the piezoelectric material forming the piezoelectric layer in the active portion. This can further increase the difference in crystal grain size of the piezoelectric material forming the piezoelectric layer between the active portion and the non-active portion, resulting in further reduction in generation and growth of cracks.

In a seventh aspect according to the sixth aspect, the liquid ejecting head may further include a first seed layer provided between the first electrode and the orientation control layer and a second seed layer provided between the orientation control layer and the piezoelectric layer. The active portion may overlap the first seed layer and the second seed layer, and the non-active portion may overlap the second seed layer and does not overlap the first seed layer. This can further increase the difference in crystal grain size between the active portion and the non-active portion, resulting in further reduction in generation and growth of cracks.

In an eight aspect according to the first aspect, the active portion may include a first active portion and a second active portion that is closer to the non-active portion than is the first active portion, and the piezoelectric material forming the piezoelectric layer in the second active portion may have a larger crystal grain size than the piezoelectric material forming the piezoelectric layer in the first active portion and may have a smaller crystal grain size than the piezoelectric material forming the piezoelectric layer in the non-active portion. This can further reduce generation of large voids caused by sudden changes in the grain size of the piezoelectric material forming the piezoelectric layer and generation of cracks starting from the voids.

In a ninth aspect according to the eighth aspect, a portion of the first electrode that overlaps the second active portion may have a thickness increasing from a non-active portion side toward a first active portion side. This can further reduce generation of large voids caused by sudden changes in the grain size of the piezoelectric material forming the piezoelectric layer and generation of cracks starting from the voids.

In a tenth aspect according to the first aspect, the pressure chambers may be arranged in an arrangement direction, the first electrode may be provided individually for the pressure chambers, and the second electrode may be shared by the pressure chambers. In this configuration, the first electrode is an individual electrode, and the boundary between the active portion and the non-active portion on both ends in the arrangement direction of pressure chambers is determined by the presence or absence of the first electrode. This makes it easier to make a difference in crystal grain size between the active portion and the non-active portion, further reducing generation and growth of cracks.

In an eleventh aspect according to the first aspect, the pressure chambers may be arranged in an arrangement direction, the first electrode may be shared by the pressure chambers, and the second electrode may be provided individually for the pressure chambers. In this configuration, the first electrode is a common electrode, and the boundary between the active portion and the non-active portion on both ends in a direction perpendicular to the arrangement direction of pressure chambers is determined by the presence or absence of the first electrode. This makes it easier to make a difference in crystal grain size between the active portion and the non-active portion, further reducing generation and growth of cracks.

In a twelfth aspect according to the first aspect, the pressure chambers may be arranged in an arrangement direction, and the piezoelectric layer may continuously extend in the arrangement direction over one of the pressure chambers. Although the boundary between the active portion and the non-active portion, which is susceptible to crack, exists at the arms on both ends in the arrangement direction of the pressure chambers, this configuration can further reduce generation and growth of cracks at the boundaries.

In a thirteenth aspect according to the first aspect, the pressure chambers may be arranged in an arrangement direction, and the active portion and the non-active portion may be arranged in a direction perpendicular to both the arrangement direction of the pressure chambers and the first direction. Although the boundary between the active portion and the non-active portion exists on both ends in the longitudinal direction of the pressure chambers, this configuration can reduce generation and growth of cracks at the boundaries.

In a fourteenth aspect according to the first aspect, the pressure chambers may be arranged in an arrangement direction, and the active portion and the non-active portion may be arranged in the arrangement direction of the pressure chambers. Although the boundary between the active portion and the non-active portion, which is susceptible to crack, exists at the arms on both ends in the width direction of the pressure chambers, this configuration can further reduce generation and growth of cracks at the boundaries.

A liquid jetting apparatus according to a fifteenth aspect includes the liquid ejecting head according to any one of the first to fourteenth aspects. This increases the voids between the crystal grains and lowers the crystal density in the piezoelectric material forming the piezoelectric layer of the arms of the piezoelectric actuator of the liquid ejecting head. This reduces the stiffness of the arms of the piezoelectric layer, reducing the residual strain caused by continuous drive. Thus, a liquid ejecting apparatus can include a liquid ejecting head that is less likely to have the possibility that fatigue deformation (deflection) of the vibration plate will increase and the piezoelectric material itself will have crack and have no risk of significant deterioration in discharge characteristics caused by repeated voltage application for a long period of time.

What is claimed is:

1. A liquid ejecting head comprising:

a substrate having pressure chambers in communication with nozzles through which a liquid is ejected;

a vibration plate on the substrate; and a piezoelectric actuator including a first electrode, a piezoelectric layer, and a second electrode stacked in a first direction on the vibration plate, wherein the piezoelectric layer has an active portion that overlaps the pressure chamber, the first electrode, and the second electrode when viewed in the first direction and a non-active portion that does not overlap at least one of the first electrode and the second electrode when viewed in the first direction, the active portion and the non-active portion are continuously provided in the piezoelectric layer, and a piezoelectric material forming the piezoelectric layer has a larger crystal grain size in the non-active portion than in the active portion.

2. The liquid ejecting head according to claim 1, wherein the crystal grain size of the piezoelectric material forming the piezoelectric layer in the active portion is smaller than or equal to half the crystal grain size of the piezoelectric material forming the piezoelectric layer in the non-active portion.

3. The liquid ejecting head according to claim 1, wherein the crystal grain size of the piezoelectric material forming the piezoelectric layer is more varied in the non-active portion than in the active portion.

4. The liquid ejecting head according to claim 1, further comprising an orientation control layer that is overlaps the active portion and does not overlap the non-active portion when viewed in the first direction, the orientation control layer being provided between the first electrode and the piezoelectric layer in the active portion.

5. The liquid ejecting head according to claim 4, wherein the piezoelectric layer is thicker than the orientation control layer in the first direction.

6. The liquid ejecting head according to claim 4, wherein a piezoelectric material forming the orientation control layer has a smaller crystal grain size than the piezoelectric material forming the piezoelectric layer in the active portion.

7. The liquid ejecting head according to claim 6, further comprising:

a first seed layer provided between the first electrode and the orientation control layer; and a second seed layer provided between the orientation control layer and the piezoelectric layer, wherein the active portion overlaps the first seed layer and the second seed layer when viewed in the first direction, and the non-active portion overlaps the second seed layer and does not overlap the first seed layer when viewed in the first direction.

8. The liquid ejecting head according to claim 1, wherein the active portion includes a first active portion and a second active portion that is closer to the non-active portion than is the first active portion, and the piezoelectric material forming the piezoelectric layer in the second active portion has a larger crystal grain size than the piezoelectric material forming the piezoelectric layer in the first active portion and has a smaller crystal grain size than the piezoelectric material forming the piezoelectric layer in the non-active portion.

9. The liquid ejecting head according to claim 8, wherein a portion of the first electrode that overlaps the second active portion when viewed in the first direction has a thickness increasing from a non-active portion side toward a first active portion side.

10. The liquid ejecting head according to claim 1, wherein the pressure chambers are arranged in an arrangement direction, the first electrode is provided individually for the pressure chambers, and the second electrode is shared by the pressure chambers.

11. The liquid ejecting head according to claim 1, wherein the pressure chambers are arranged in an arrangement direction, the first electrode is shared by the pressure chambers, and the second electrode is provided individually for the pressure chambers.

12. The liquid ejecting head according to claim 1, wherein the pressure chambers are arranged in an arrangement direction, and the piezoelectric layer continuously extends in the arrangement direction over one of the pressure chambers.

13. The liquid ejecting head according to claim 1, wherein the pressure chambers are arranged in an arrangement direction, and the active portion and the non-active portion are arranged in a direction perpendicular to both the arrangement direction and the first direction.

14. The liquid ejecting head according to claim 1, wherein the pressure chambers are arranged in an arrangement direction, and the active portion and the non-active portion are arranged in the arrangement direction.

15. A liquid ejecting apparatus comprising the liquid ejecting head according to claim 1.

* * * * *